(12) United States Patent
Kakarlamudi et al.

(10) Patent No.: US 9,390,130 B2
(45) Date of Patent: Jul. 12, 2016

(54) WORKLOAD MANAGEMENT IN A PARALLEL DATABASE SYSTEM

(75) Inventors: Subbarao Kakarlamudi, Milpitas, CA (US); Zbigniew Omanski, San Jose, CA (US); Patrick M. Brown, San Diego, CA (US); Tharaknath Capirala, Chennai (IN); Anan Mahasintunan, San Jose, CA (US); Arvind Narain, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1294 days.

(21) Appl. No.: 12/316,412

(22) Filed: Dec. 12, 2008

(65) Prior Publication Data

US 2010/0153963 A1    Jun. 17, 2010

(51) Int. Cl.
*G06F 17/30* (2006.01)
*G06F 9/50* (2006.01)

(52) U.S. Cl.
CPC ........ *G06F 17/30445* (2013.01); *G06F 9/5083* (2013.01); *G06F 17/30306* (2013.01)

(58) Field of Classification Search
None
See application file for complete search history.

(56) References Cited

U.S. PATENT DOCUMENTS

| | | | | |
|---|---|---|---|---|
| 5,890,150 | A  * | 3/1999 | Ushijima et al. | 707/714 |
| 7,788,672 | B2 * | 8/2010 | Tanaka | 718/106 |
| 7,793,278 | B2 * | 9/2010 | Du et al. | 717/160 |
| 7,797,691 | B2 * | 9/2010 | Cockx et al. | 717/155 |
| 7,805,436 | B2 * | 9/2010 | Richards et al. | 707/720 |
| 8,010,954 | B2 * | 8/2011 | Little et al. | 717/149 |
| 2006/0101470 | A1 * | 5/2006 | Swanberg | 718/105 |
| 2006/0143350 | A1 * | 6/2006 | Miloushev et al. | 710/242 |
| 2007/0116228 | A1 * | 5/2007 | Schneider et al. | 379/211.01 |
| 2007/0130231 | A1 * | 6/2007 | Brown et al. | 707/204 |
| 2007/0288280 | A1 * | 12/2007 | Gilbert et al. | 705/8 |
| 2008/0028076 | A1 * | 1/2008 | Gupta et al. | 709/226 |

* cited by examiner

*Primary Examiner* — Eric Coleman
(74) *Attorney, Agent, or Firm* — Olympic Patent Works PLLC

(57) ABSTRACT

A workload management service component of a parallel database-management system monitors usage of computational resources in the parallel database-management system. The component provides a query-processing-task-management interface and a query-execution engine. The engine receives query-processing requests associated with one of a number of services from host computers, and accesses the workload-management-services component to determine whether to immediately launch execution of query-processing tasks corresponding to the received query-processing requests. Alternatively, the engine accesses the component to place the query-processing requests on wait queues for subsequent execution. The determination is based on the current usage of computational resources within the parallel database-management system.

15 Claims, 25 Drawing Sheets

102 – Parallel DBMS
104 – Computer System
106 – High BW Communications Media
108 – Remote Host Computer
110 – Communications Media

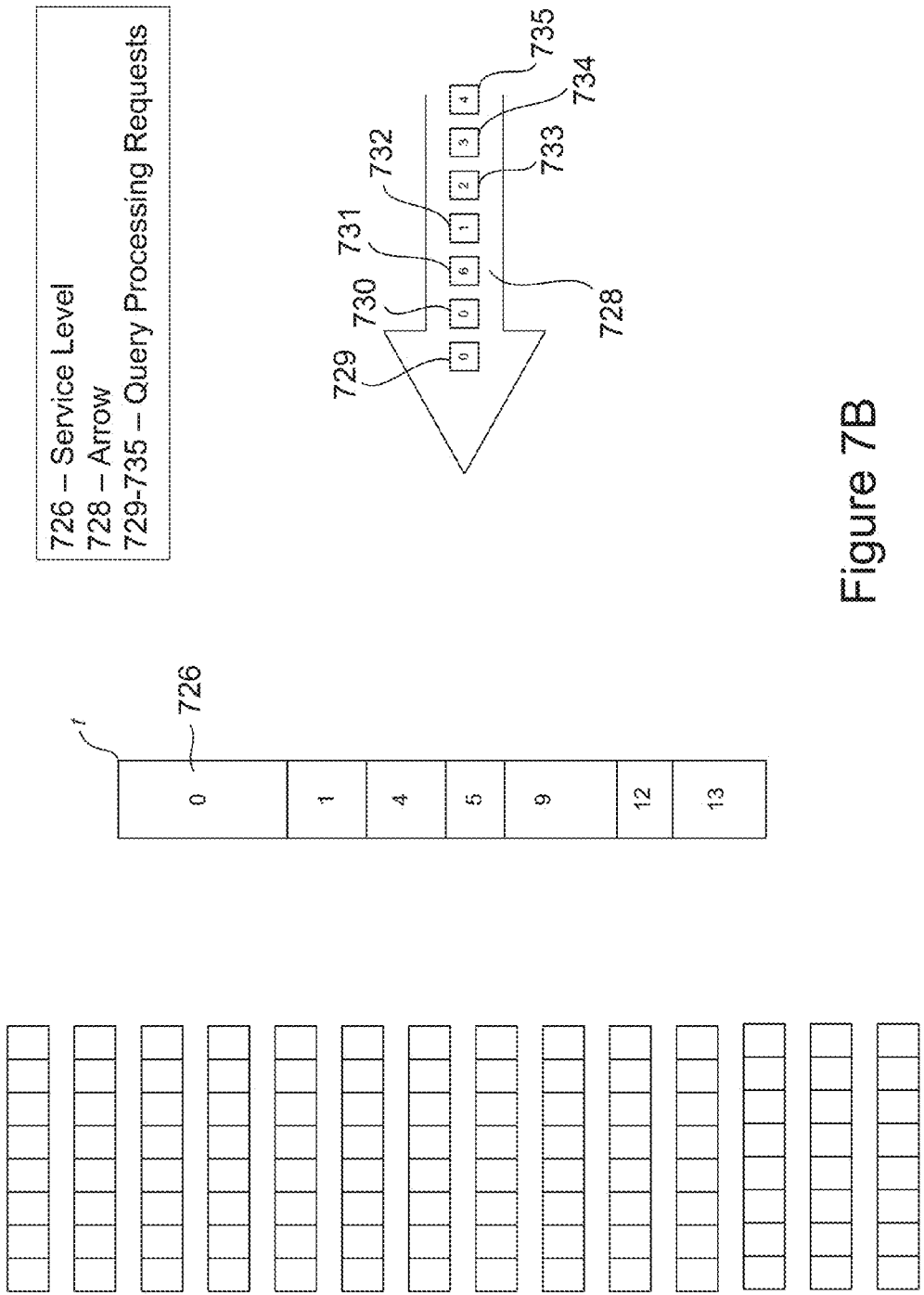

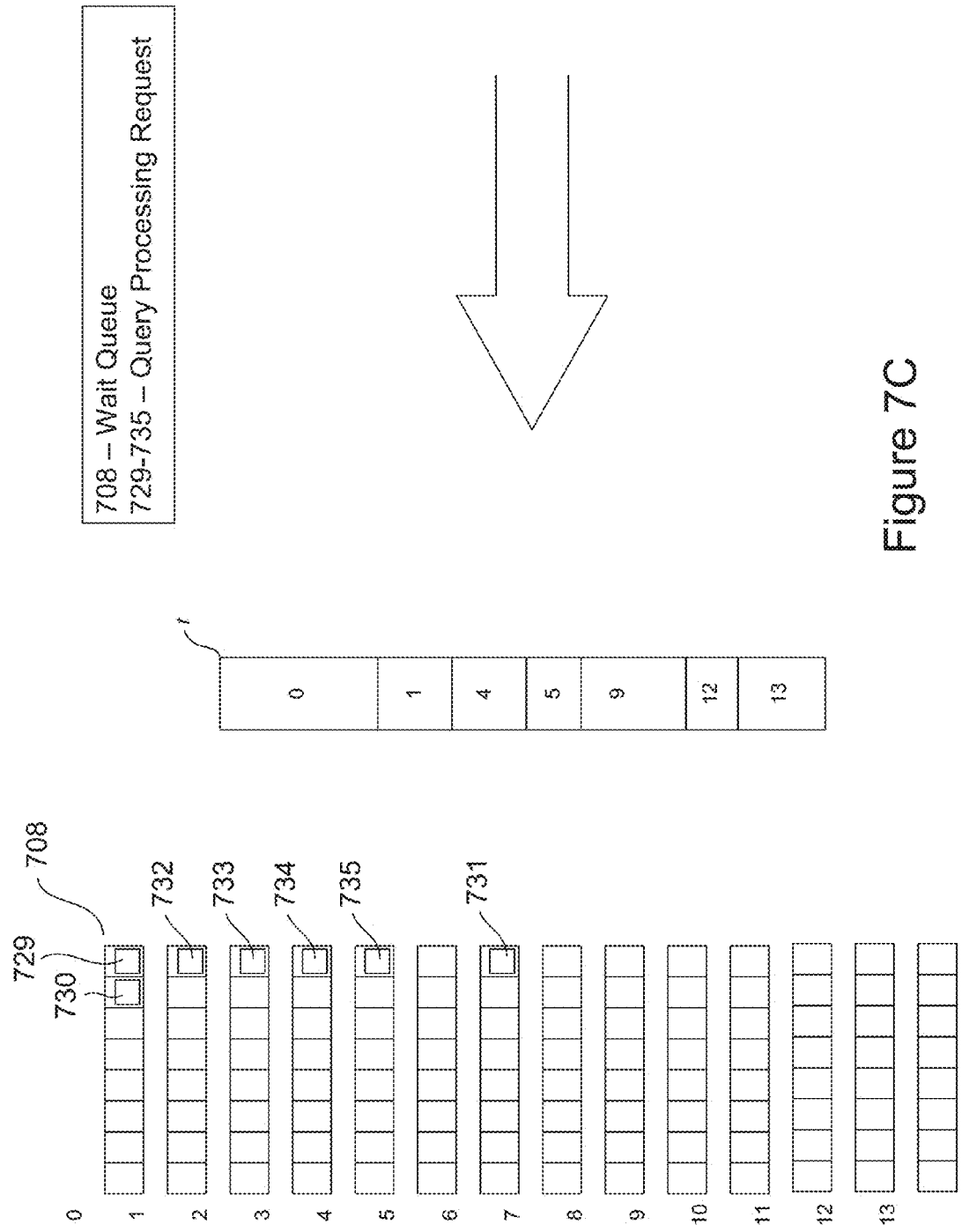

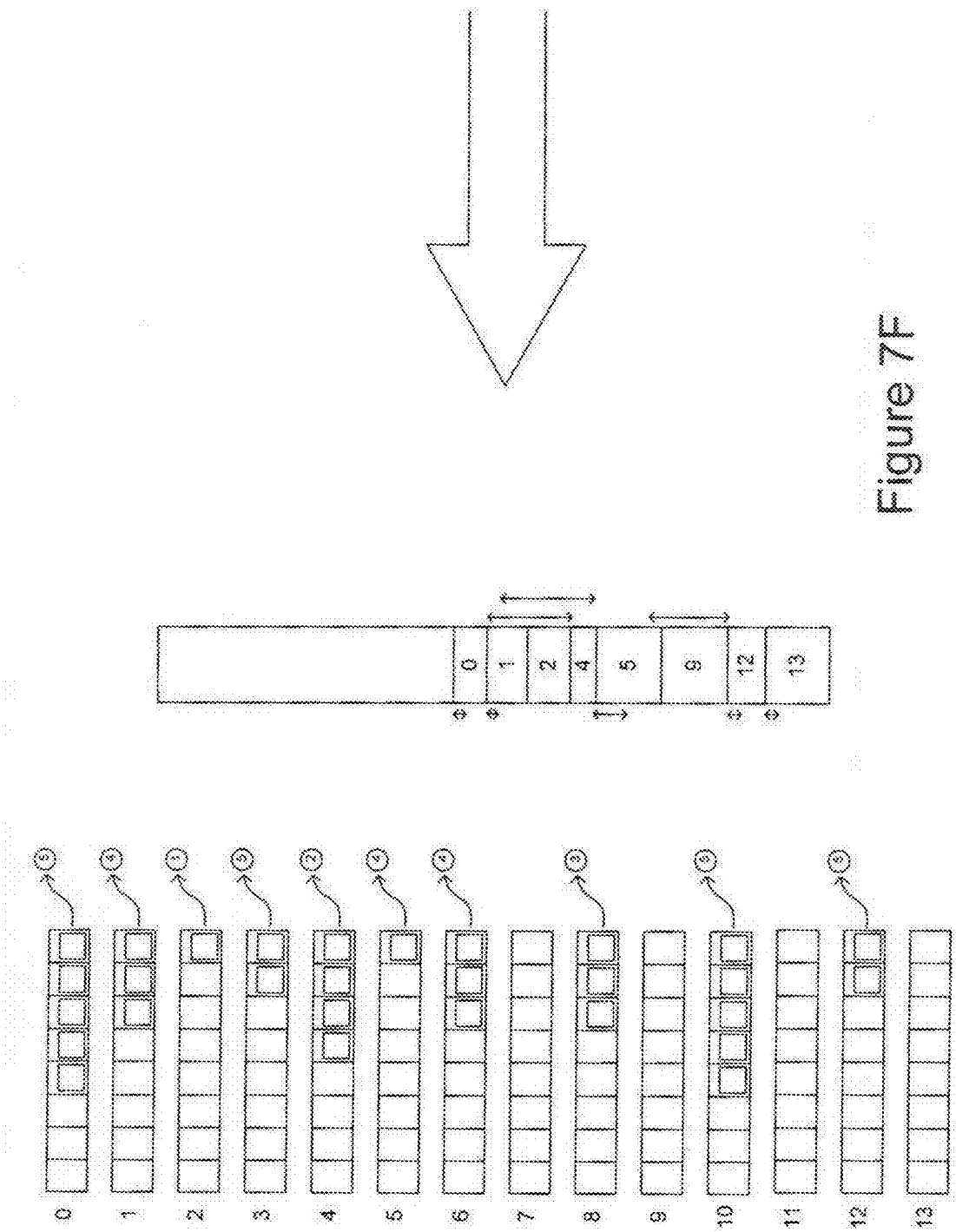

WORKLOAD MANAGEMENT IN A PARALLEL DATABASE SYSTEM

TECHNICAL FIELD

The present invention is related to database-management systems and, in particular, to balancing and managing query-processing workloads within a parallel database-management system.

BACKGROUND OF THE INVENTION

Database-management systems were developed in the 1960's and have continued to evolve to the present time. Initially, database-management systems were generally implemented as software programs running on single computer systems. The early database-management systems provided relatively primitive functionality and cumbersome interfaces for querying data stored within single computer systems. Over time, new database models and accompanying schema-definition languages and query languages were developed, providing powerful logical tools and interfaces to both human users and application programs. These models facilitated use of a variety of increasingly sophisticated hardware platforms for database-management systems, from distributed computer systems and mass-storage devices interconnected by high-bandwidth communications media to highly specialized hardware platforms specifically designed for executing database-management systems.

The distribution of database-management systems and query-processing engines over multiple processors within single multi-processor systems and over multiple computer systems within distributed computer systems has provided an enormous increase in the query-processing bandwidth of database-management systems as well as corresponding decreases in the average elapsed times needed to process queries. However, distribution of query processing over multiple processors and/or computer systems involves solving many extremely complex problems, including problems associated with efficient query-processing-task decomposition, efficient inter-task communication, efficient sharing of distributed resources, ensuring database consistency over distributed components and tasks, and other such problems. While many of these problems have been addressed in current implementations of parallel-database-management systems, researchers in database-management-system fields, designers and developers of database-management systems, designers and developers of hardware on which database-management systems execute, vendors of database-management systems and underlying hardware, and, ultimately users of database-management systems continue to seek advancements in distributed database-management systems that provide ever-increasing query-processing bandwidth and efficiencies in query-processing times and use of computational resources.

BRIEF DESCRIPTION OF THE DRAWINGS

FIGS. 7A-H illustrate one approach to allocation of resource capacity among query-processing tasks associated with services according to one embodiment of the present invention.

DETAILED DESCRIPTION OF THE INVENTION

Figure 1:
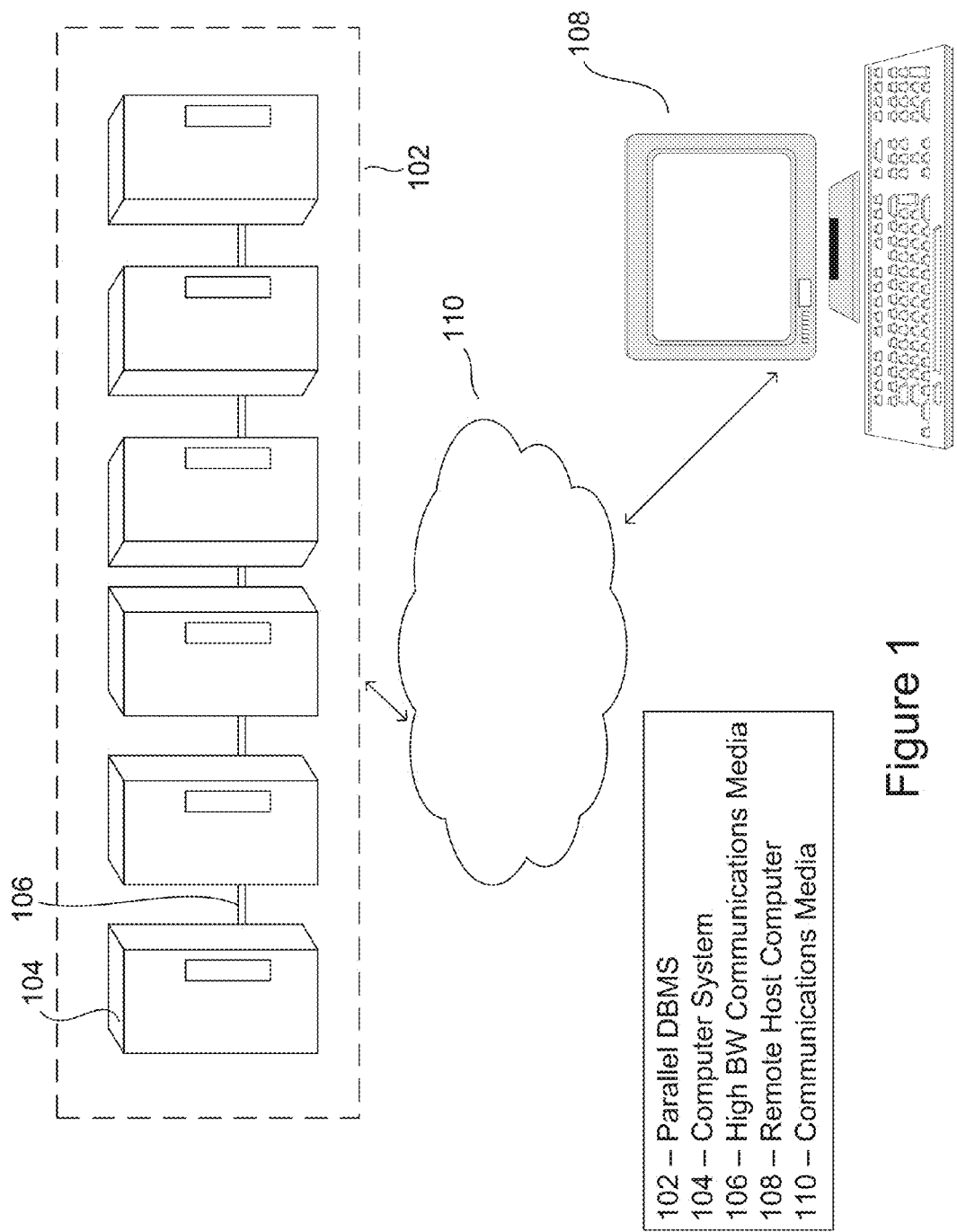
FIG. 1 illustrates a parallel database-management system that serves as a context for discussion of embodiments of the present invention.

Embodiments of the present invention are directed to workload management services that provide for query-processing-workload balancing and management within parallel database-management systems. FIG. 1 illustrates a parallel database-management system that serves as a context for discussion of embodiments of the present invention. The parallel database-management system 102 comprises a number of individual computer systems, such as computer system 104, each having multiple processors, shared memory, and other shared computational resources. The individual computer systems within the parallel distributed database-management system are linked together through high-bandwidth communications media 106. Clients of the parallel database-management system access the parallel database-management system via remote host computers, such as remote host computer 108, and any of numerous communications media 110 interconnecting the remote host computers with the parallel database-management system 102. In general, it is application programs running on host computers that interface to the parallel database-management system, generally through standard database-management-system interfaces. Currently, the majority of parallel database-management systems support relational-database-management-system interfaces, which receive and execute queries that are expressed in the structured query language ("SQL"). However, embodiments of the present invention are applicable not only to relational database-management systems, but also to alternative types of database-management systems that use alternative models for schema creation, schema management, data entry, and query expression.

Figure 2:
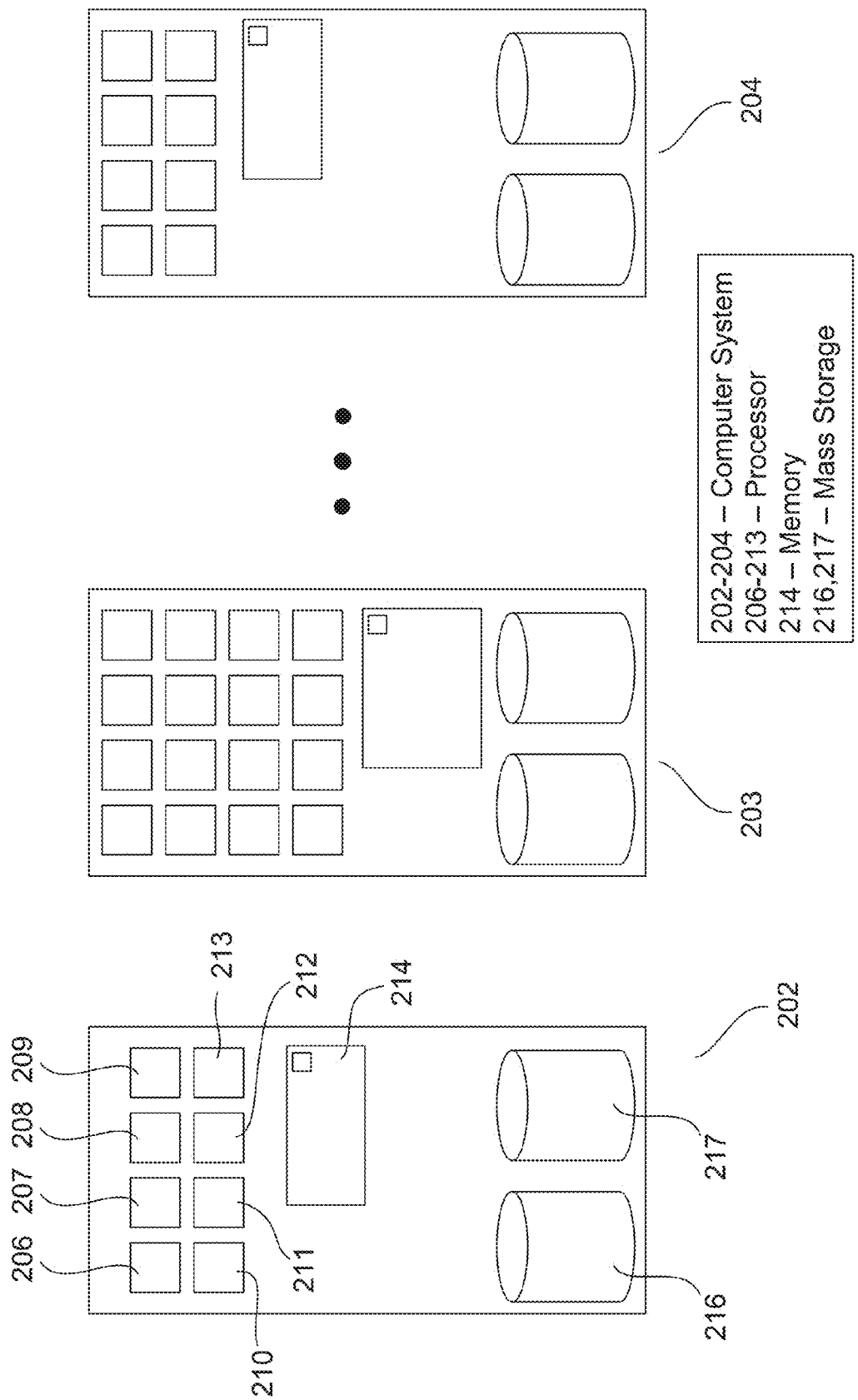
FIG. 2 illustrates certain of the characteristics of parallel database-management systems relevant to implementation of embodiments of the present invention.

Each computer system within a parallel database-management system, such as parallel database-management system 102 in FIG. 1, is generally a very complex, high-end multi-processor computer system. FIG. 2 illustrates certain of the characteristics of parallel database-management systems relevant to implementation of embodiments of the present invention. As shown in FIG. 2, a parallel database-management system consists of some number of discrete, high-end, multi-processor computer systems 202-204. Each system includes a number of processors. For example, computer system 202 in FIG. 2 includes eight processors 206-213, while system 203 includes 16 processors and the final computer system 204 includes eight processors. Each system also includes internal memory resources, such as one or more memories 214 in computer system 202, and internal or attached mass-storage devices, such as mass-storage devices 216-217 in computer system 202 of FIG. 2. Of course, a computer system may contain thousands of additional components and subcomponents that are linked together through myriad internal data paths.

Figure 3:
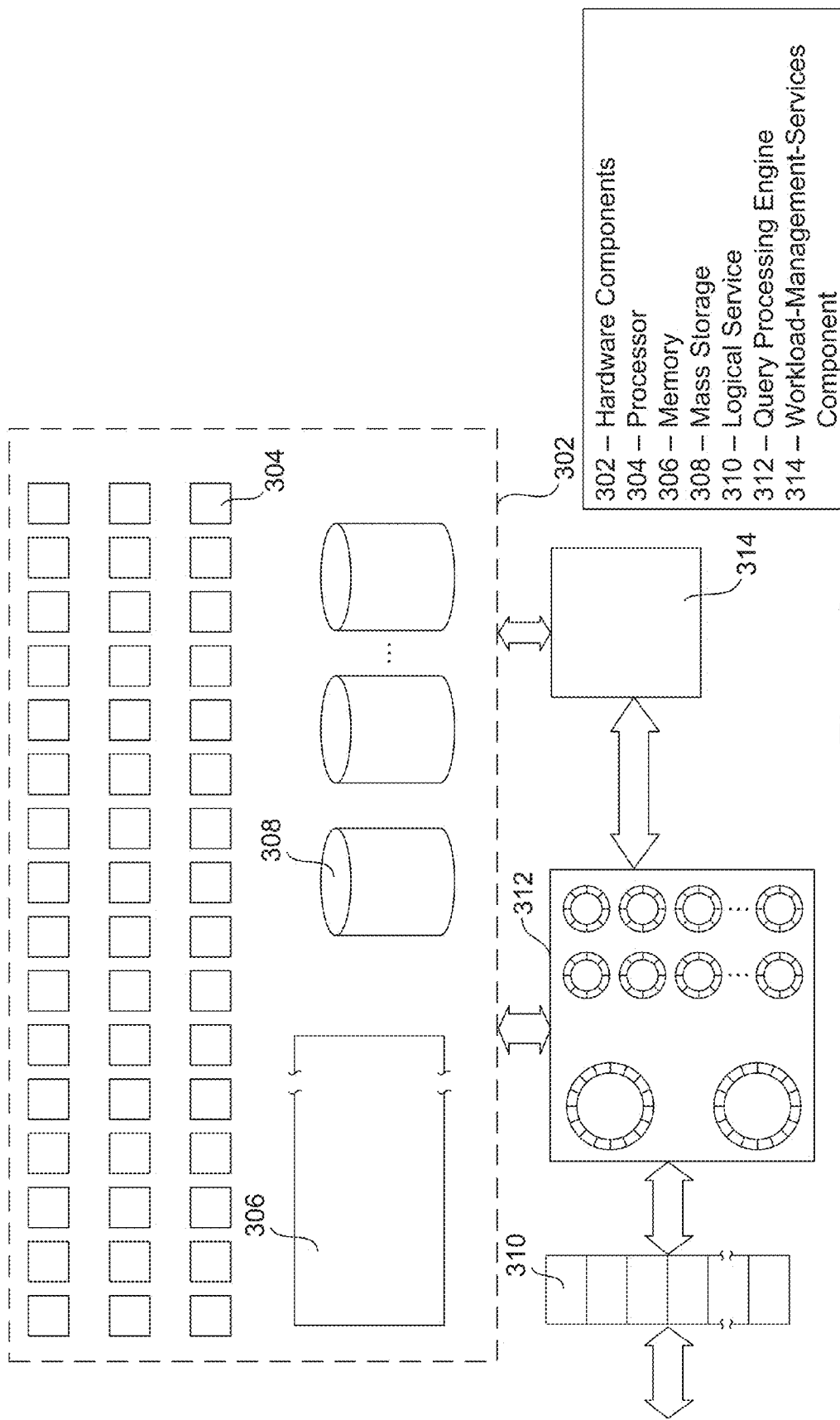
FIG. 3 illustrates the abstract components of one individual computer system within a parallel, distributed database-management system.

In general, embodiments of the present invention abstract the relevant internal components of a computer system as various types of abstract aggregate or individual computational resources. For the purposes of the present invention, a computer system, and the software-implemented database-management-system components that execute within each individual system within a parallel database-management system, can be abstracted, for purposes of describing embodiments of the present invention, relatively straightforwardly. FIG. 3 illustrates the abstract components of one internal computer system within a parallel, distributed database-management system. The components include hardware components 302, such as processor 304, various types of internal memories, such as memory 306, and mass-storage devices, such as mass-storage device 308. Software components include an array of logical services 310, a query-processing engine 312, and a workload-management-services component 314, which together represent one embodiment of the present invention. The query-processing component 312 and workload-management-services component may themselves be distributed over multiple processors within the computer system. The query-processing component 312, for example, may be partitioned into a number of parallel query-processing-component subtasks, each of which executes on a different processor within a multi-processor computer system. The array of logical services 310 represents the various query-processing services provided by the distributed parallel database-management system. The query-processing engine 312 coordinates reception of query-processing requests, query processing, and return of the results of query processing to remote host computers. The workload-management-services component 314, also referred to as a "monitor," constantly monitors the hardware components of the computer system 302 in order to maintain current data that provides a view of the current usage of, and remaining capacities of, the various types of computational resources relevant to query processing. The workload-management-services component 314 is consulted, by the query-processing engine 312, for permission to execute particular query-processing tasks within the parallel database-management system, as discussed in greater detail below.

Figure 4:
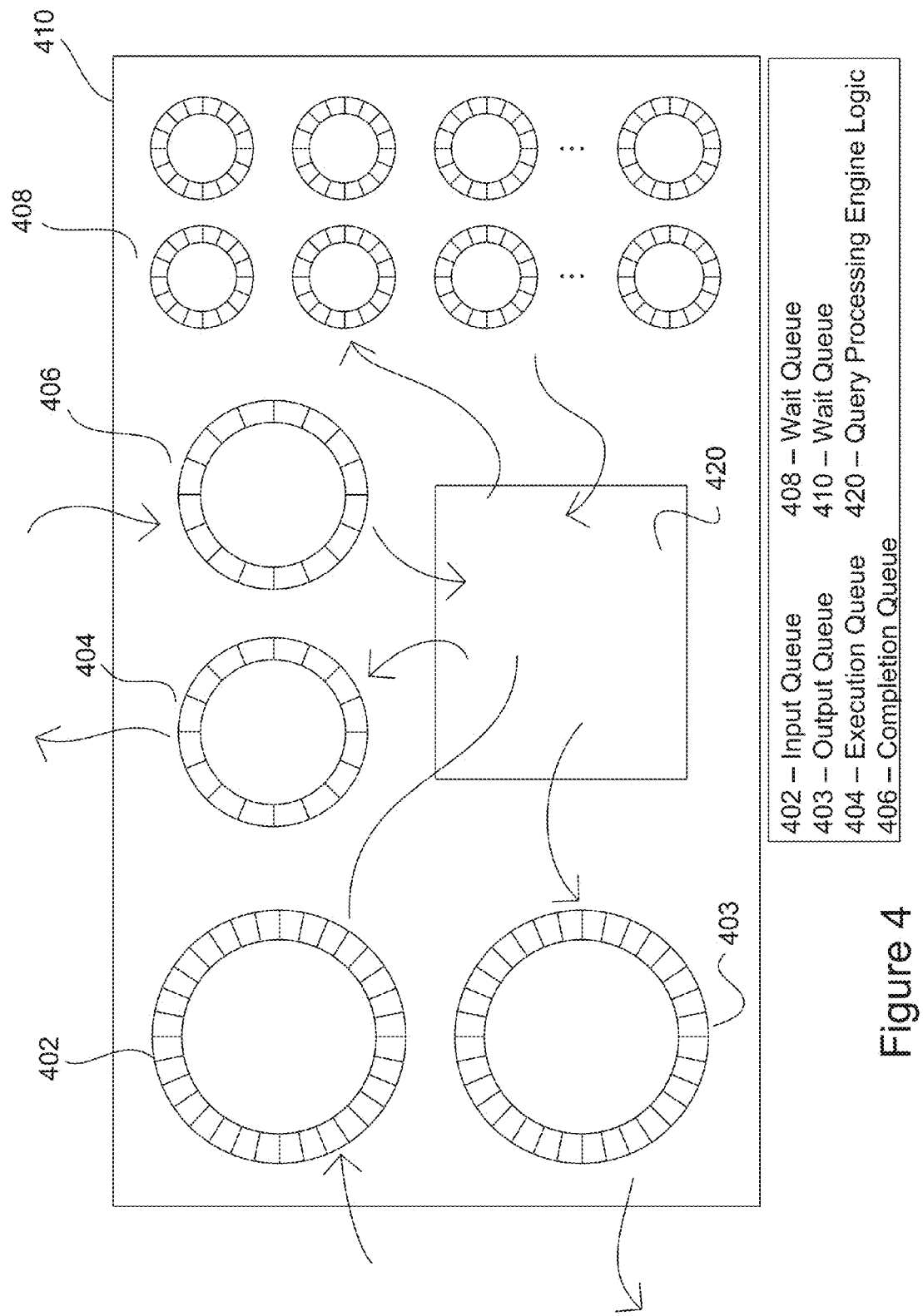
FIG. 4 illustrates the flow of query-processing requests through the query-processing engine.

FIG. 4 illustrates the flow of query-processing requests through the query-processing engine. The query-processing engine includes an input queue 402 and an output queue 404 for receiving query-processing requests from host computers and forwarding query-execution results back to host computers, respectively. The query-processing engine includes an execution queue 404 from which query-processing tasks corresponding to query-processing requests are launched on the hardware components of the computer system and an input queue 406 onto which query-processing requests are queued following completion of their corresponding to query-processing tasks. The query-processing engine also maintains sets of wait queues, shown as columns of wait queues 408 and 410 in FIG. 4, on which query-processing requests may be suspended for subsequent execution, as additional computational resources become available. Each set of wait queues may be associated with a different type of computational resource.

Query-processing requests are received from host computers on the input queue 402. Query-processing-engine logic 420 dequeues tasks from the input queue and queues the tasks to the execution queue 404 for execution or to any of various wait queues 408 and 410, when sufficient resources for executing the query-processing requests are not available. Upon completion of a query-processing task, the corresponding query-processing request is queued to completion queue 406 for subsequent processing by the query-processing engine, including return of query-processing results, via output queue 403, to the requesting remote host computer. The query-processing engine also removes query-processing requests from wait queues for queuing to the execution queue 404 for execution. In FIG. 4, queues are shown as circular linked lists although, as is well known to those familiar with programming and computational data structures, the circular queues are implemented within linear memory address spaces.

Figures 5A, 5B:
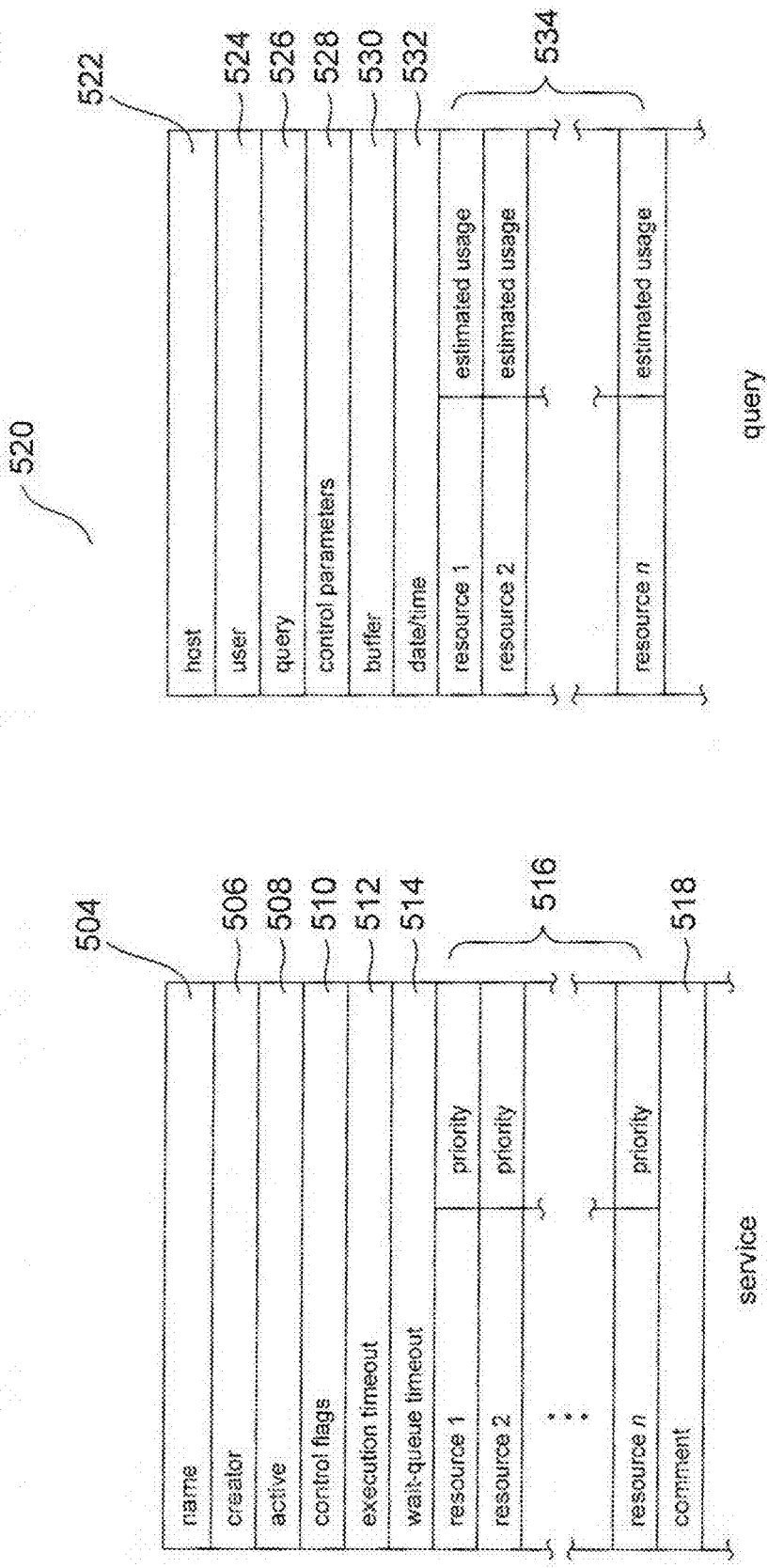
FIGS. 5A-B illustrate exemplary data structures that, in turn, represent services and query-processing requests in parallel database-management systems that incorporate embodiments of the present invention.

FIGS. 5A-B illustrate exemplary data structures that, in turn, represent services and query-processing requests in parallel database-management systems that incorporate embodiments of the present invention. FIG. 5A shows a data structure that represents a service, and that, together with identical data structures representing additional services, forms the array of logical services (310 in FIG. 3). A service is a logical entity, within a parallel database-management system, that represents a collection of query-processing characteristics that together define a service level for query processing. Query-processing requests are generally submitted to, or associated with, particular services, or service levels, within a parallel database-management system. A service generally includes one or more of: a name 504; identification information for a creator of the service 506; an indication of the times when the service is active 508; any of various different control flags 510 that parametrically define various operational characteristics of the service; an indication of a threshold amount of execution time following which queries are potentially timed out by the parallel database-management system 512; a similar time-out threshold for queries waiting on wait queues 514; a list of priorities associated with computational resources 516; and additional fields which contain additional information about the service, including an alphanumeric text comment 518. Services are generally created by database administrators through a database-administration interface. In certain embodiments of the present invention, each service includes a single priority with respect to all computational resources, while, in alternative embodiments of the present invention, a service includes a priority with respect to each aggregated, abstract computational resource, such as memory or processor bandwidth.

FIG. 5B illustrates a data structure representing a query-processing request. Query-processing-request data structures may have different forms and contents depending on where, in the parallel distributed database-management system, the query-processing-request data structures are stored and processed. A query-processing-request data structure 520 generally includes: an indication of the remote host computer associated with the query 522, identification of the user on the host computer who submitted the query 524; the text of a database query or a reference to a stored, compiled query 526; various control parameters that control execution of the query 528; a reference to a buffer to which query results and status information may be delivered 530; a date and time at which the query is submitted 532; and a list of estimated usages of computational-resource capacities for each of various resources needed for execution of the query-processing request 534. Query-processing requests are sent from remote host computers to the parallel database-management system and, often in somewhat altered for, are queued and manipulated within the query-processing engine to represent pending and executing query-processing tasks. The exact contents of service data structures and query-processing-request data structures may vary significantly from one implementation of a database-management system to another, and within a given database-management system.

One problem associated with parallel database-management systems is the problem of dynamically managing incoming query-processing requests and distributing query-processing tasks associated with the query-processing requests across processors and computers within a parallel, distributed database-management system. In many current database-management systems, workload-balancing components seek to ensure that the numbers of executing query-processing tasks on each processor within each computer system of a distributed, parallel database-management system are approximately equal. This, in fact, provides a first level of query-processing-task balancing. However, distribution of query-processing tasks to equalize the number of query-processing tasks currently executed by each processor does not necessarily produce a well-balanced use of computational resources within a parallel, distributed database-management system, such as that discussed above with reference to FIGS. 1-3. For example, individual query-processing tasks can vary significantly with respect to the number of computational resources used to execute the task, and the relative portions of the capacities of the various computational resources used for executing the query-processing task. One complex query against high-cardinality tables may require 50% of the query-processing bandwidth of eight processors and 40% of available shared memory, for example, while another query may require only 0.5% of the query-processing bandwidth of a single processor and less than 0.001% of available shared memory. Distributing such widely varying queries evenly, by numbers of queries, over computational resources may result in little use of certain of the computational resources while the capacities of others are fully consumed. In the latter case, overall system performance may degrade considerable, due to contention for unavailable resources among executing query-processing tasks.

While it is important, in workload management, to attempt to accurately balance workloads across computational resources, it is also important that the methods employed for workload management do not themselves consume huge amounts of computational resources and unnecessarily perturb query-processing operation of the system. Thus, simple and easily implemented, but effective, methods for workload management are sought by researchers and developers of parallel distributed database-management systems.

Embodiments of the present invention include workload-management-services components (314 in FIG. 3) and query-processing engines (312 in FIG. 3) implemented to interface to the workload-management-services component. Together, these components provide a service-based query-processing-task distribution that balances consumption of computational resources across the computational resources of a parallel, distributed database-management system.

Figure 6:
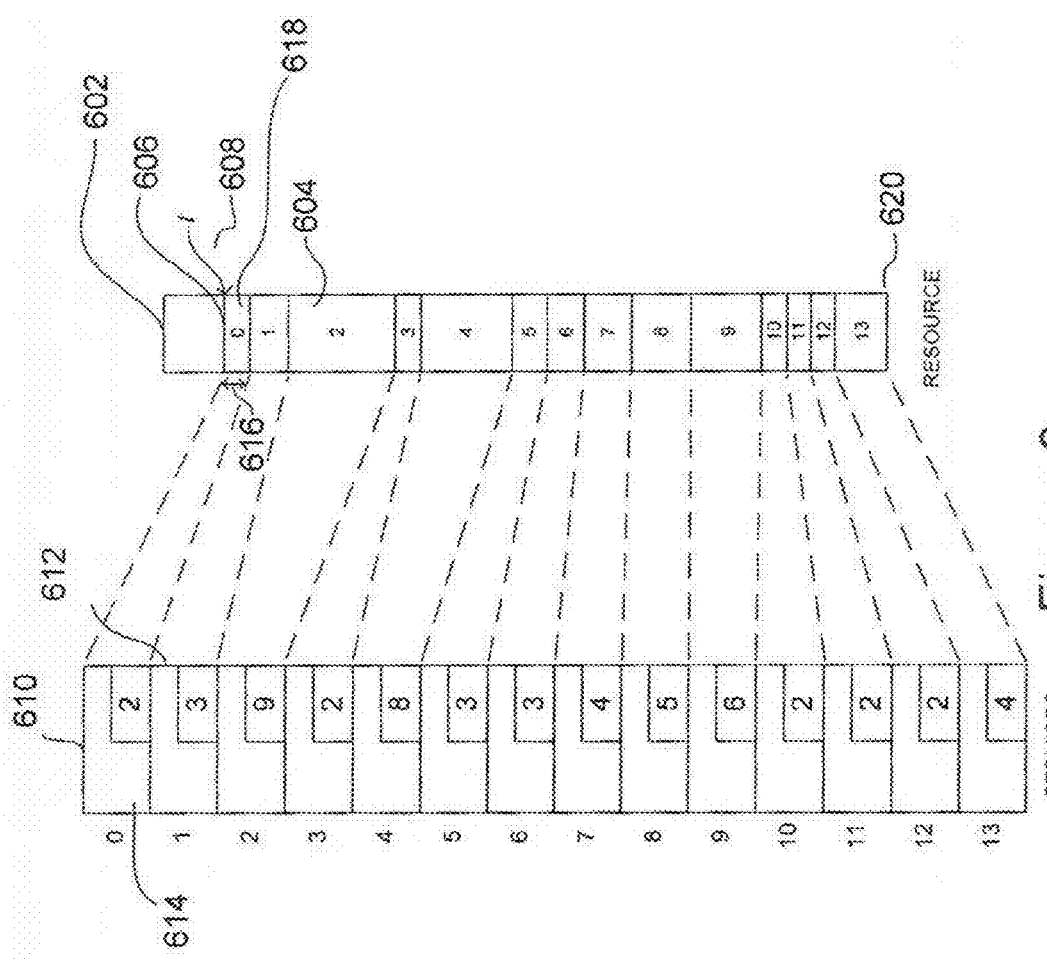
FIG. 6 illustrates service-based partitioning of the capacity of a particular computational resource, according to one embodiment of the present invention.

FIG. 6 illustrates service-based partitioning of the capacity of a particular computational resource, according to one embodiment of the present invention. In FIG. 6, and in subsequent figures, a computational resource is represented as a rectangular column 602. The full area within the column, or the height of the column, represents the total capacity of the computational resource. There are various different types of computational resources, as discussed above. Processing resources may have capacities described by processor-cycles per second or some other measure of the computational bandwidth. A memory resource has a capacity equal to the total number of bytes, words, or other such data-storage units that can be stored in the memory resource. Similar considerations apply to mass-storage-device computational resources. Thus, in all cases, the resource can be considered to provide a capacity that ranges from 0% to 100%, and the resource representation 602 is a thermometer-like representation where sections labeled by numbers, such as section 604, represent the portion of the total capacity of the resource currently being used, or consumed, by a particular entity. In FIG. 6, each entity represents all of the query-processing tasks associated with a particular service.

A top line 606 in the resource representation indicates the total amount of the capacity currently used, or consumed. The top line can vary from 0% to 100%. In most cases, the distributed computer system is operated so that the top line, or total consumed capacity, does not exceed a threshold value 608. For example, a computer system is often operated so that only 95% of available memory is used, at any particular instant in time, to prevent deleterious effects of near-maximal memory consumption, including thrashing over the severely depleted resource by executing computing tasks. Although the system strives to ensure that no more than the threshold maximum capacity of a resource is used during system operation, resource-consumption monitoring is periodic and may be imprecise, so that the actual level of consumption of a computational resource may exceed the threshold value at any given point in time.

In various embodiments of the present invention, as shown in FIG. 6, when the capacity of a resource is used up to a maximum-useable capacity indicated by an associated threshold, each service within the array of services 610 is allocated some maximum portion of the maximum-useable capacity of the resource. The apportionment of resource capacity among services is based on a weight assigned to the service. In FIG. 6, each service includes a weight value, such as the weight value "2" 612 in the block 614 corresponding to service 0. Considering service 0, the maximum portion of the resource allowed to all of the query-processing tasks associated with service 0, under steady-state, resource-exhaustion conditions, can be computed as 2 divided by the sum of all the weights associated with all the services, 2/55, or 3.6%. Thus, the height 616 of the portion 618 of the maximum-usable capacity of the resource allocated to service 0 is 3.6 percent of the length of the column from 0% capacity 620 up to the maximum-usage threshold 608. The other services in the array of services are allocated portions of the total maximum usable capacity of the resource, as shown in FIG. 6, in similar fashion.

Figure 7A:
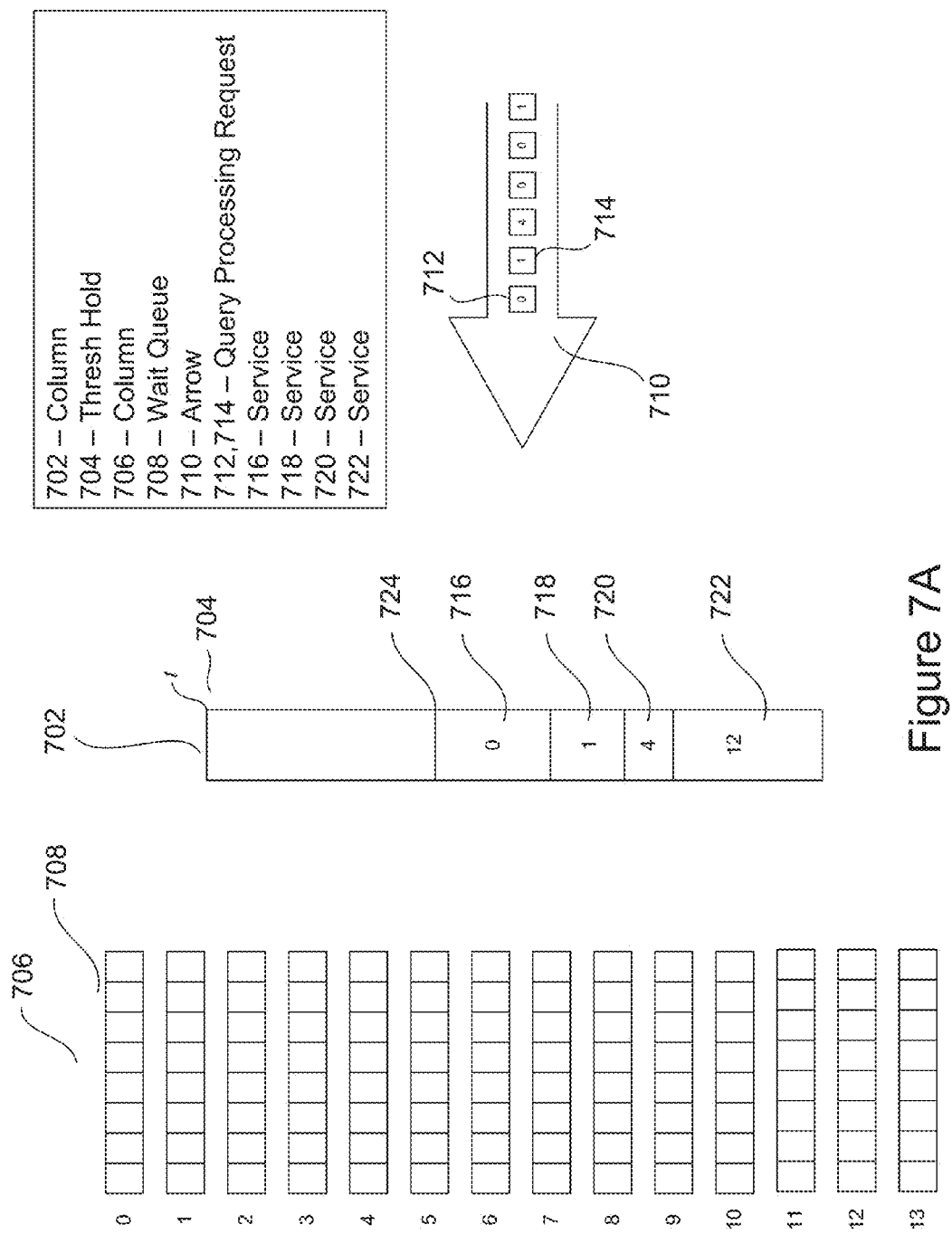

A particular service may frequently consume a greater portion of the capacity of a resource allocated to the service when the total consumed capacity of the resource remains below the maximum-usage threshold value, or when one or more services are not associated with currently executing query-processing tasks. FIGS. 7A-H illustrate one approach to allocation of resource capacity among query-processing tasks associated with services according to one embodiment of the present invention. FIGS. 7A-H all use similar illustration conventions, described next with reference to FIG. 7A. A resource is represented by a column 702, as described above with reference to FIG. 6. Only that portion of resource capacity up to the maximum-usage threshold capacity 704 is shown in the representation. Fourteen wait queues, shown as linear queues, for query-processing requests associated with the 14 different services are shown on the left portion of FIG. 7A in a column 706. For example, wait queue 708 serves as the wait queue for service 0. Incoming query-processing requests to the query-processing engine are shown, together with an indication of the service with which they are associated, in a large arrow 710 on the right-hand portion of FIGS. 7A-H. For example, in FIG. 7A, a next incoming query-processing request 712 is associated with service 0, and a following query-processing request 714 is associated with service 1, etc. As shown in the column representation of the resource, currently executing query-processing tasks are associated with service 0 (716), service 1 (718), service 4 (720), and service 12 (722). There are currently no query-processing requests on wait queues associated with the computational resource represented by column 702. In FIG. 7A, six new query-processing tasks are input. Since the total capacity of the resource currently consumed, represented by the top 724 of the regions associated with services, is well below the threshold level 704, there remains available computational-resource capacity, and it is likely that all of the currently input query-processing requests will be immediately launched for execution, at least considering only the resource represented by column 702.

FIG. 7B illustrates resource usage and associated service wait queues at a subsequent point in time. At this point in time, although there are no query-processing requests on wait queues, the entire maximum-usable capacity of the resource is currently consumed by executing processes. Comparing FIG. 7B to FIG. 6, it is immediately obvious that a much larger portion of the total usable capacity of the resource is currently being used by query-processing tasks associated with service level 0 726 than the portion of the total usable capacity of the resource allocated to service level 0 (618 in FIG. 6) under steady-state conditions of maximal resource usage. However, this was allowed because, up until the point shown in FIG. 7B, there remained excess resource capacity, and so it was preferable to allow services to exceed their allocations shown in FIG. 6, since they could do so without impacting other services contending for the resource. However, as shown in FIG. 7B, new query-processing requests are currently arriving 728.

FIG. 7C illustrates how the newly arriving query-processing requests (728 in FIG. 7B) are handled in view of the exhaustion of the resource. All of the incoming query-processing requests, shown in FIG. 7C, are queued to the wait queues for the services associated with the query-processing requests. For example, query-processing requests 729 and 730 have been queued to wait queue 708 associated with service 0, and the remaining query-processing requests 731-735 are queued to their service-associated wait queues. Whenever any query-processing requests is queued to the wait queue of a service, all other incoming query-processing requests that require usage of the resource in question are immediately queued to wait queues, as well. In this way, query-processing requests are fairly removed from wait queues for subsequent execution, rather than stranding query-processing requests indefinitely on wait queues.

Figure 7D:
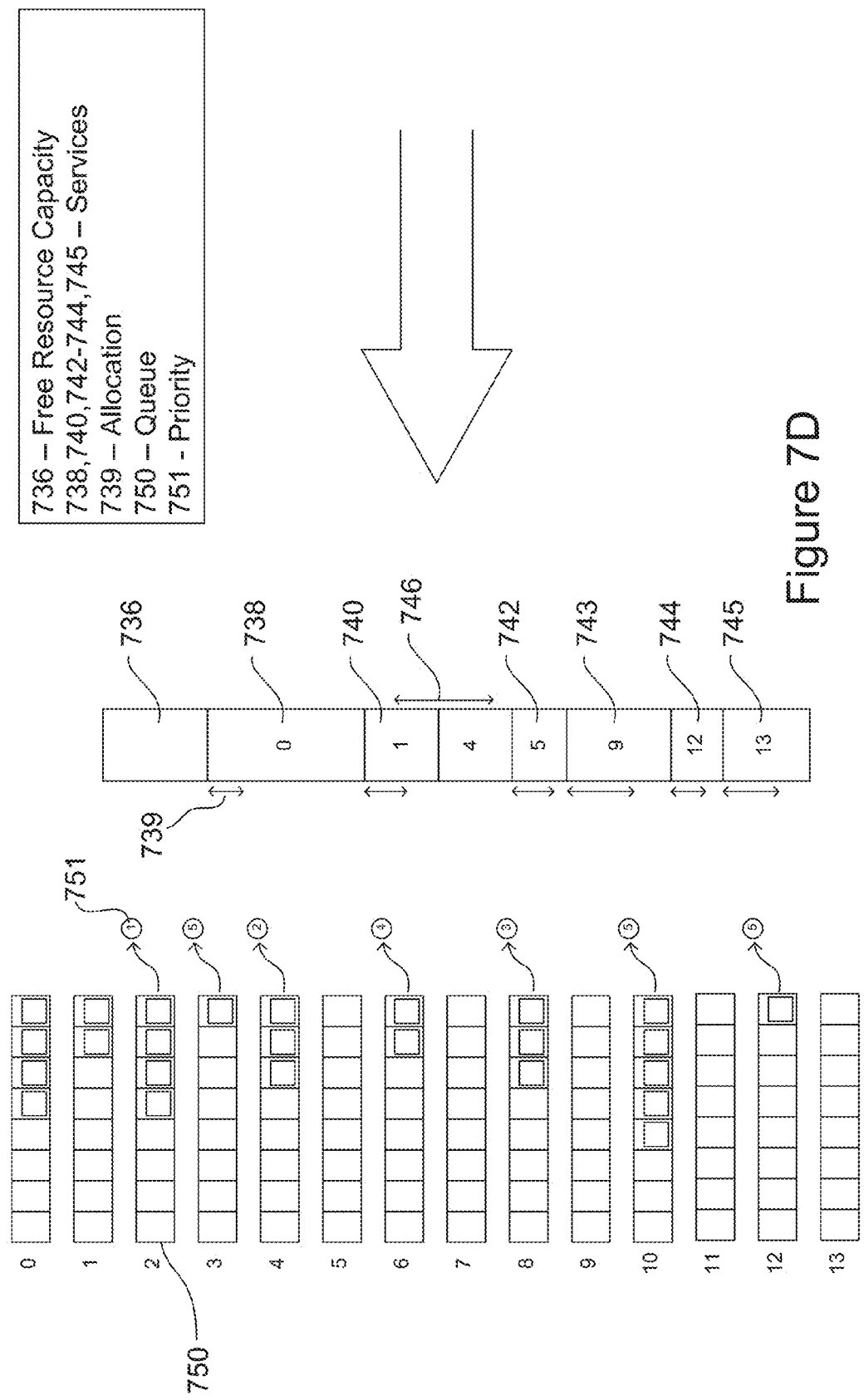

FIG. 7D shows a point in time, after the point in time shown in FIG. 7C, at which numerous query-processing tasks that were executing at the point in time shown in FIG. 7C have ended, freeing up usable resource capacity. The free resource capacity is shown, in FIG. 7D, by rectangle 736. At this point in time, query-processing requests may be removed from wait queues in order to utilize the full usable capacity of the resource. Comparing FIG. 7D to FIG. 6, it is easily observed that, for certain services, the current portion of the total maximum usable resource capacity currently used by query-processing tasks associated with that service far exceeds their allocated portions, as shown in FIG. 6. For example, the resource capacity currently used by query-processing tasks associated with service 0 738 far exceeds the allocation for service 0, represented by double-headed arrow 739. Similarly, services 1 (740), 5 (742), 9 (743), 12 (744), and 13 (745) all have been allocated a greater portion of the resource capacity than their allocated portions, shown in FIG. 6. Therefore, in a first pass of dequeuing query-processing requests from wait queues, no query-processing requests associated with the services that exceed their allocated portions of resource capacity are removed and launched. Query-processing requests associated with remaining services are candidates for dequeuing and launching. For example, as shown by double-headed arrow 746, query-processing tasks associated with service 4 are currently using far less than the portion of resource capacity allocated for service 4. Query-processing tasks are removed from wait queues in priority order, with the priority equivalent to the weights for services shown in FIG. 6. The highest-priority service is service 2, with a wait of 9. Therefore, the query-processing requests queued to the queue 750 associated with service 2 are first dequeue and corresponding query-processing tasks are launched. However, only up to the allocated portion of the resource capacities for each service, shown in FIG. 6, can be allocated to dequeued query-processing requests for the service in the first dequeuing pass. In FIG. 7D, the circled numbers, such as the circled number 1 751, indicate the priority for dequeuing tasks from each of the candidate wait queues.

Figure 7E:
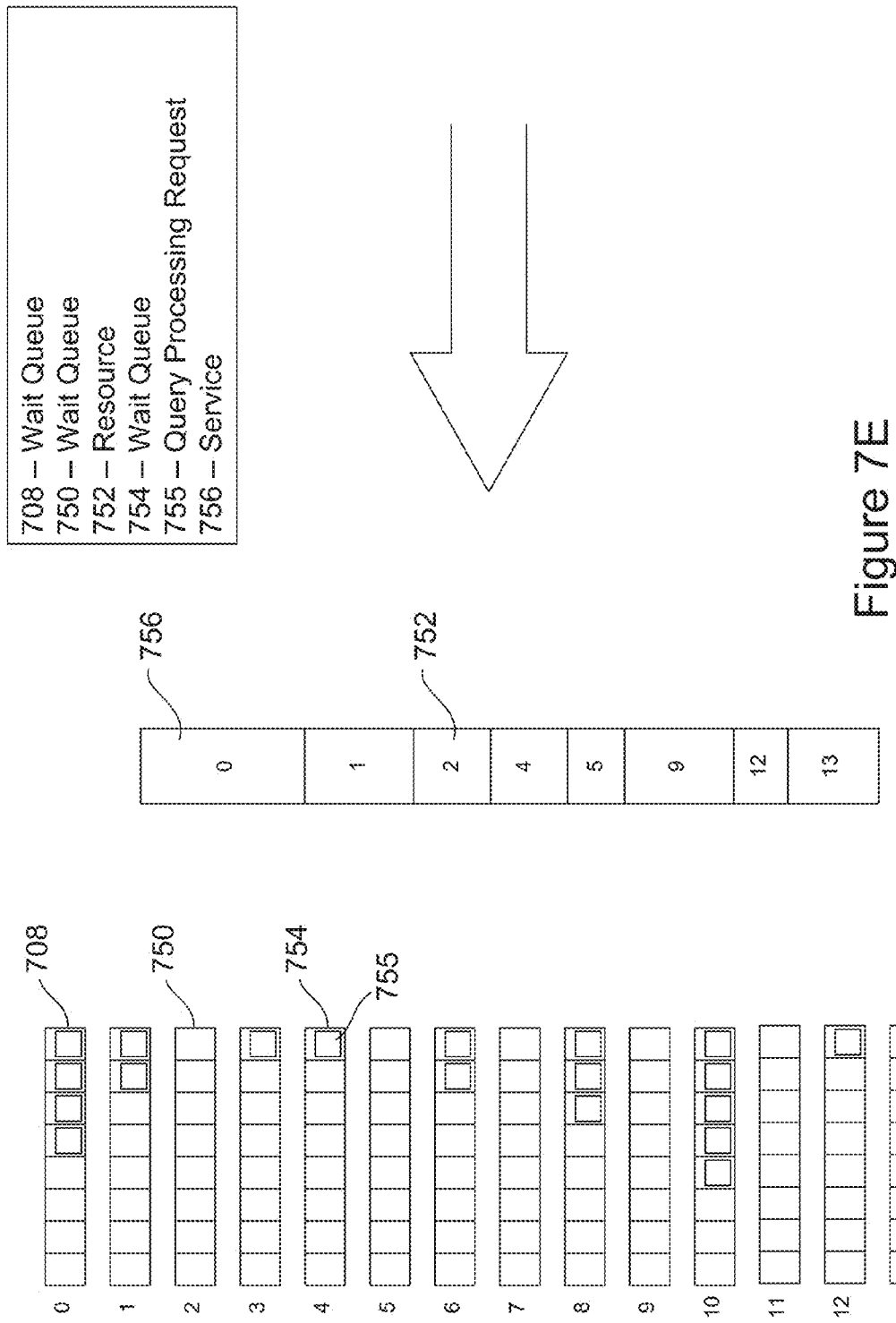

FIG. 7E illustrates the results of the first dequeuing pass. All of the query-processing requests queued to wait queue 750 were dequeued and launched, resulting in a relatively large portion of the capacity of the resource 752 now consumed by query-processing tasks associated with service 2. Two of the three query-processing requests queued to the wait queue 754 associated with service 4 have been dequeued and launched, but the final query-processing requests 755 could not be launched without exceeding the portion of the resource capacity allocated to service 4, as indicated in FIG. 6. Because the system is operating at maximum-allowed usage of the resource, no service queue is allowed to exceed its allocated portion of the resource capacity. Note, however, that many of the query-processing tasks associated with service 0 are still executing, and that, therefore, service 0 is still consuming far more of the total capacity of the resource than allocated to service 0 under full-capacity conditions. For this reason, no query-processing requests have been dequeued and launched from queue 708.

FIG. 7F shows the resource usage at a subsequent period in time, after more query-processing tasks that were executing on FIG. 7E have completed. There is now significant available resource capacity for consumption by waiting query-processing requests. FIG. 7F illustrates the order of the wait queues from which query-processing requests are next removed and launched for execution, up to the point of allocation of the total maximum usable capacity of the resource. Again, while a service continues to use a greater portion of the capacity of the resource than allocated, no tasks are removed from the queue associated with the service until a first complete pass through the wait queues is completed.

Figure 7G:
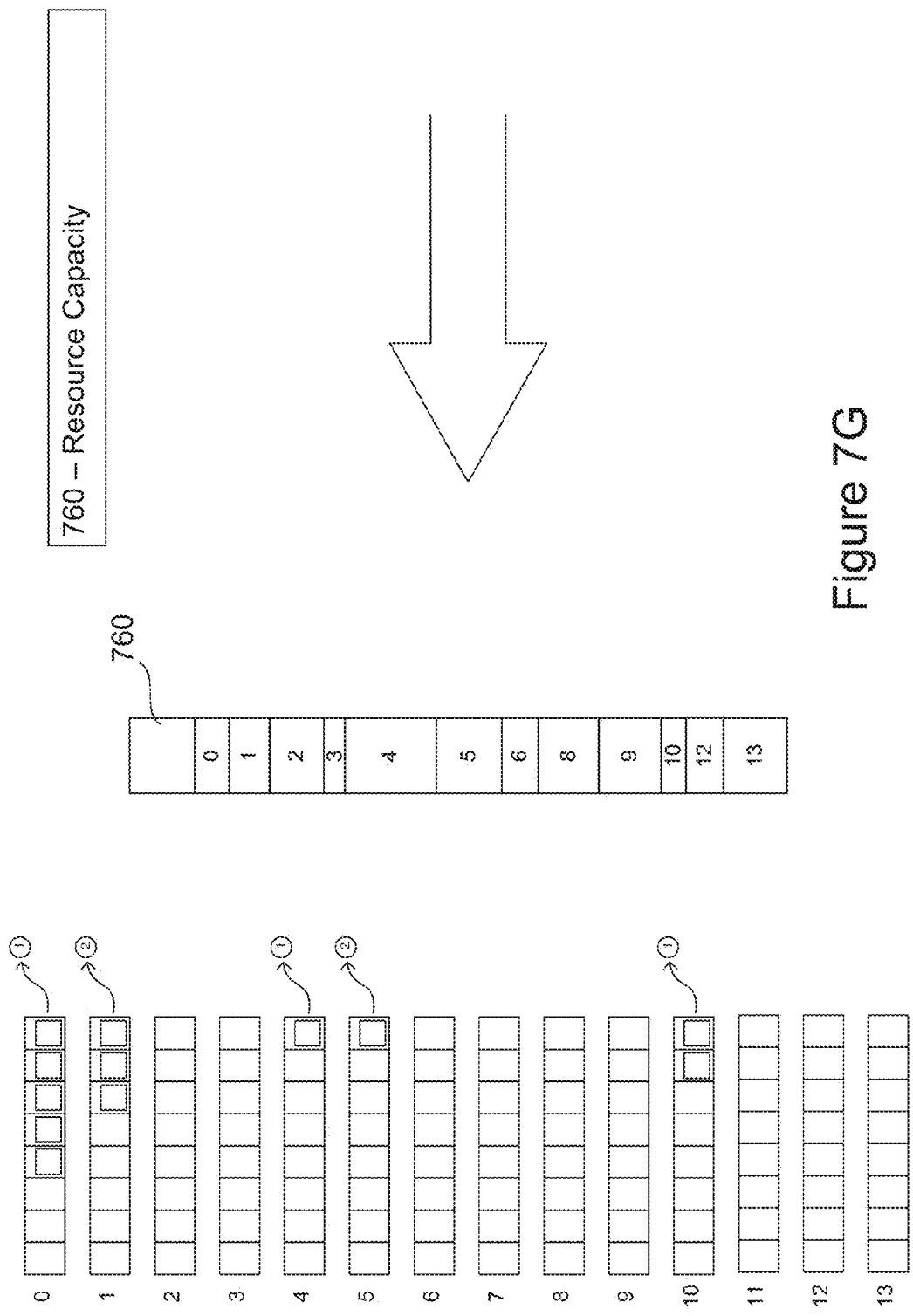
Figure 7H:
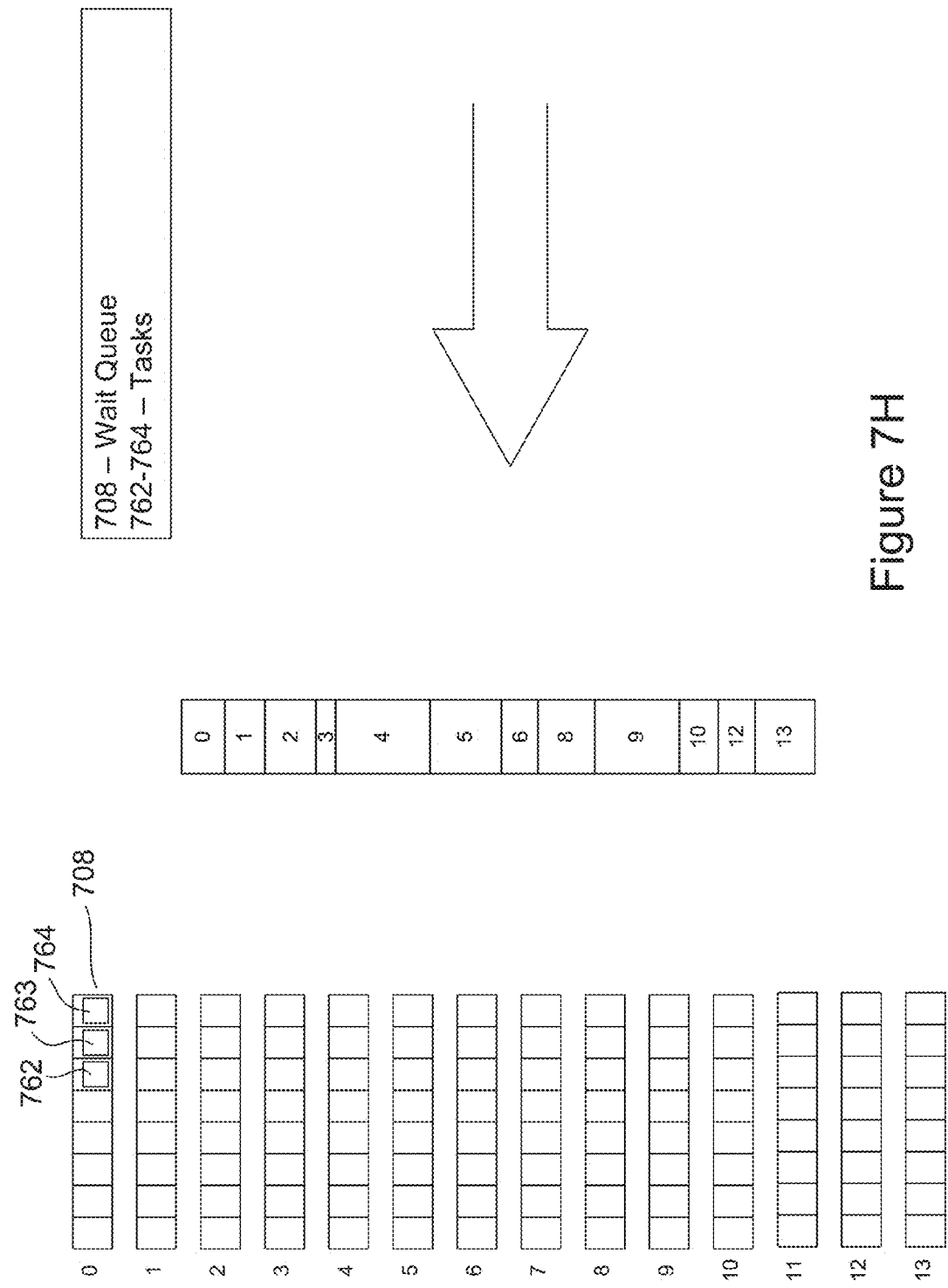

FIG. 7G illustrates the state of the computer system, with respect to the resource, following the first pass of query-processing-request dequeuing and corresponding query-processing-task execution launching at the point in time represented by FIG. 7F. All query-processing requests have been removed from the queues with available per-service allocated capacity, leaving only the query-processing requests shown in FIG. 7G queued to wait queues. In a second dequeuing pass, since there is still remaining usable resource capacity 760 with respect to the resource, query-processing requests are removed from wait queues in priority order for launching, up to the point that the total maximal usable capacity of the resource is allocated. FIG. 7H illustrates the state following the second pass of task dequeuing and launching. The full capacity of the resource is exhausted when all but three tasks 762-764 remain on the wait queue 708 associated with service 0.

In certain embodiments of the present invention, resource capacity above per-service maximum-usage allocations, as shown in FIG. 6, may be allocated in weight-proportion of those services with queued query-processing requests. Alternatively, a round-robin approach can be used within priority levels, or other allocation methods can be applied.

It should be noted that a single weight, or priority, may be associated with each service. In such cases, prioritization of dequeuing from wait queues and launching of execution is based solely on one value. Alternatively, each aggregated computational resource may be associated with a priority, so that dequeuing with respect to wait queues associated with each computational resource is separately controlled by a resource-specific priority. Also, when multiple priorities are used, query-processing requests are generally dequeued from wait queues in longest-elapsed-wait-time to shortest-elapsed-wait-time order, to avoid starvation of query-processing requests.

Figure 8:
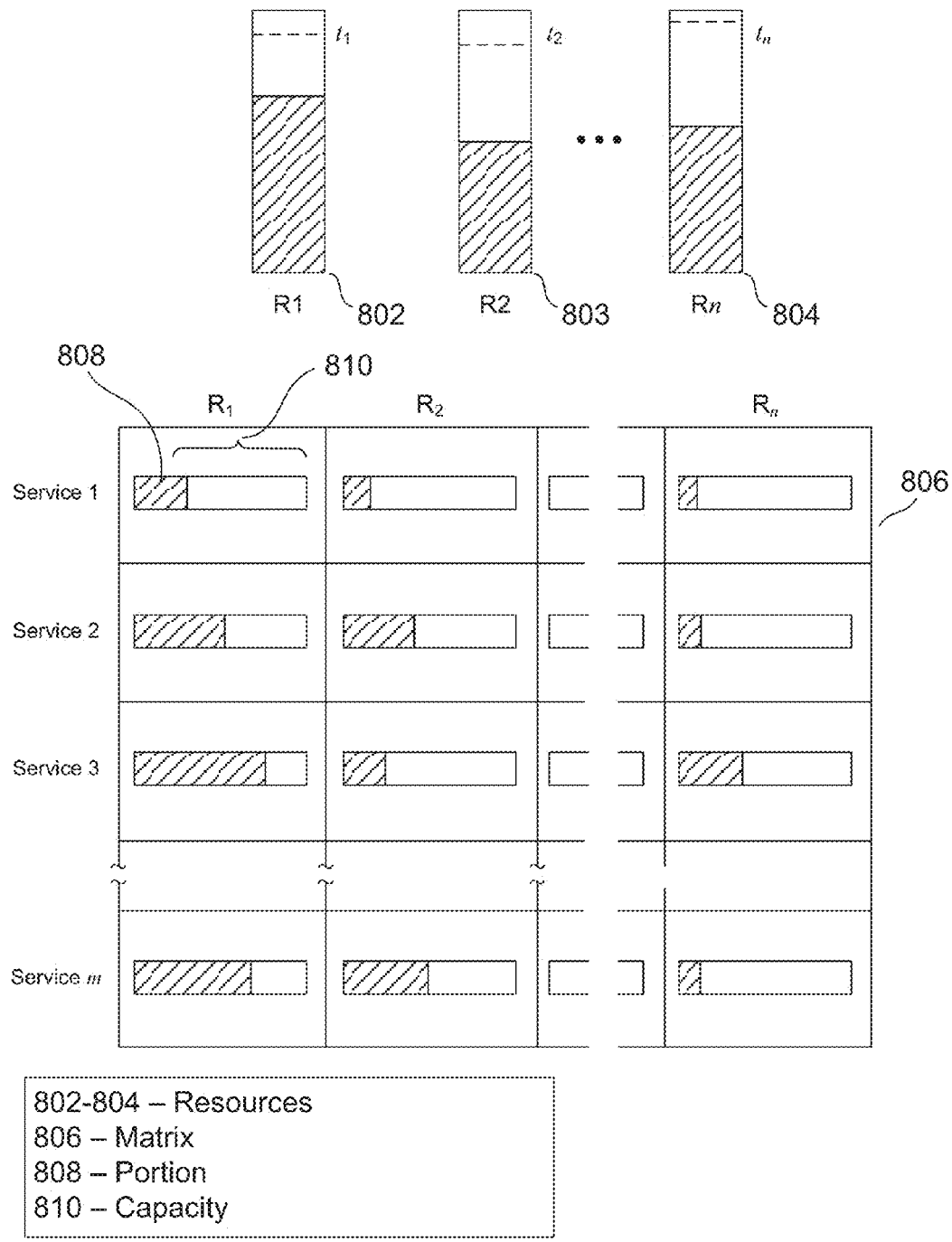
FIG. 8 graphically illustrates the type of data that is collected and stored by the workload-management-service component (314 in FIG. 3) of a database-management system implemented according to certain embodiments of the present invention.

FIG. 8 graphically illustrates the type of data that is collected and stored by the workload-management-service component (314 in FIG. 3) of a database-management system implemented according to certain embodiments of the present invention. The workload-management-service component constantly monitors the usage of computational resources within the computer system, and maintains, for each resource 802-804, an indication of the portion of the total capacity of the resource currently consumed by executing tasks as well as indications of the thresholds above which additional resource capacity should not be allocated. In addition, as illustrated by the matrix 806 in FIG. 8, the monitor also maintains indications of the portions of resource capacity allocated for each service/resource pair under steady-state maximum-resource-consumption conditions (as shown in FIG. 6, discussed above) currently used by each of the different services. Thus, for example, service 1 currently uses the shaded portion 808 of the total capacity 810 of resource $R_1$ allocated to service 1 under steady-state maximum-resource-consumption conditions. As discussed above, a service may use more than its allocated portion of a resource under certain conditions. Thus, the monitor knows, at each point in time, to what extent the capacity of each global resource is currently consumed, the usage thresholds for each global resource, and the portion of the maximum allocation for each service under resource-exhaustion conditions currently allocated to the service. With this information, the monitor can advise the query-processing engine as to whether or not a newly arriving query-processing request should be launched or placed on a wait queue, and whether currently waiting query-processing requests should be dequeued from wait queues and launched for execution.

Because the resource-consumption information is collected by the monitor periodically, using operating-system calls, the monitor does not an instantaneous, fully accurate picture of resource usage, but generally maintains a reasonably accurate view of resource usage as allowed by the periodicity of monitoring and the precision of the usage data returned by the operating system. Note also that, in general, distributed resources, such as processing capacity of a multi-processing computer system, may be collectively considered as a single resource, by the monitor, may be considered as a set of individual resources, or may be considered as both, for various purposes. For example, in deciding whether or not to allow execution of query-processing tasks, the monitor may initially refer to a aggregate processing-bandwidth resource as a first test to determine whether there is sufficient overall processing bandwidth for launching a next query-processing task, and, when that test succeeds, may then examine the individual processors on which the query-processing task will execute to ensure that the maximum usage capacities of the individual processes are not exceeded.

Figure 9:
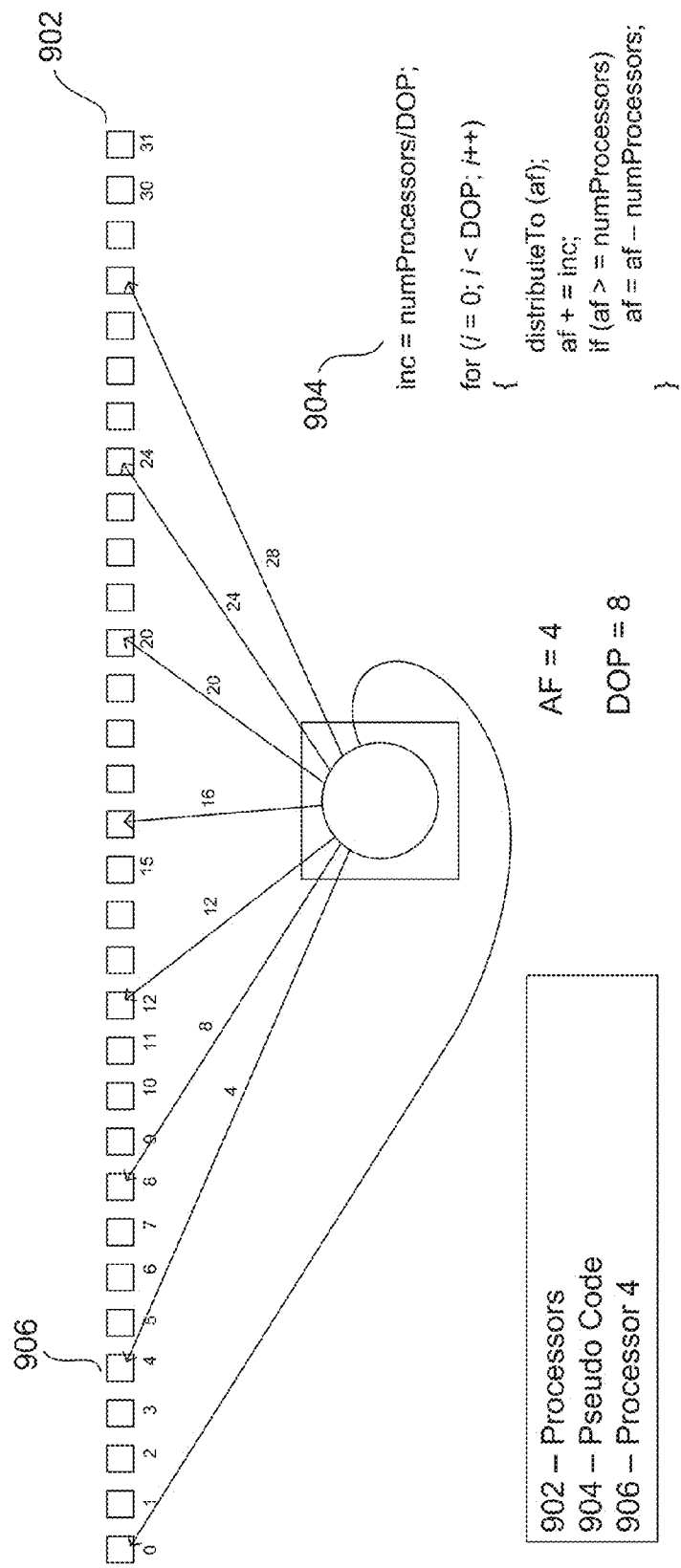
FIG. 9 shows one method by which distributed tasks are assigned to processors by a query-processing engine within a distributed parallel database-management system implemented according to embodiments of the present invention.

FIG. 9 shows one method by which distributed tasks are assigned to processors by a query-processing engine within a distributed parallel database-management system implemented according to embodiments of the present invention. In FIG. 9, the 32 processors of a distributed, parallel database-management system are shown as small boxes in a horizontal line of small boxes 902. A query-processing request may be characterized by a degree-of-parallelism ("DOP"), indicative of the number of processors upon which the query-processing task corresponding to the query-processing request has been compiled to run. The query-processing engine requests an affinity number ("AF") for each query-processing request, during preparation of the request for execution, from the monitor. The monitor returns an AF value that indicates the first processor in the array of processors on which a portion of the query-processing task, or subtask, is to be launched. Remaining query-processing subtasks for the query-processing request are launched on additional processors are evenly distributed through the sequence of processors, as indicated by the short pseudocode 904 shown in FIG. 9. For example, if a query-processing request with DOP equal to 8 receives an AF of 4 from the monitor, then the query-executing engine launches the first of 8 query-processing subtasks on processor 4 906 and successively launches each of seven additional query-processing subtasks at intervals of 4 processors, in the sequence of processors, where the interval 4 is obtained by dividing 32, the number of processors in the parallel database-management system, divided by 8, the DOP of the query-processing request, with distribution of subtasks to processors wrapping at the end of the sequence of processors back to the beginning of the sequence, as shown in FIG. 9. The AF-based distribution of query-processing subtasks and the service-based allocation of computational resources, discussed above with reference to FIGS. 6-7H, provide for a straightforward and efficient workload-management method that represents one embodiment of the present invention. The AF-based distribution also provides a means for considering various different subtasks distributions separately from an initial test for available aggregate processing bandwidth. When there is overall sufficient processing bandwidth to execute a task, then, in certain embodiments of the present invention, distribution based on several different AF numbers may be considered to find a distribution pattern for which all of the processors on which subtasks are launched have sufficient, per-processor bandwidth to execute the subtasks assigned to them.

FIGS. 10-15 provide control-flow diagrams that illustrate logic associated with workload balancing in the query-execution engine (312 in FIG. 3) of a distributed, parallel database-management system that represents one embodiment of the present invention. These control-flow diagrams provide an illustration of one possible workload-balancing method. However, many alternative embodiments are possible, including embodiments in which each service is associated with only a single priority, embodiments in which services may not consume portions of all of the computational resources monitored by the workload-management-services component, and many additional embodiments. The control-flow diagrams show an embodiment of the present invention in which services have priorities, or weights, associated with multiple aggregate computational resources, but in which it is assumed that each query-processing task access all aggregate computational resources.

Figure 10:
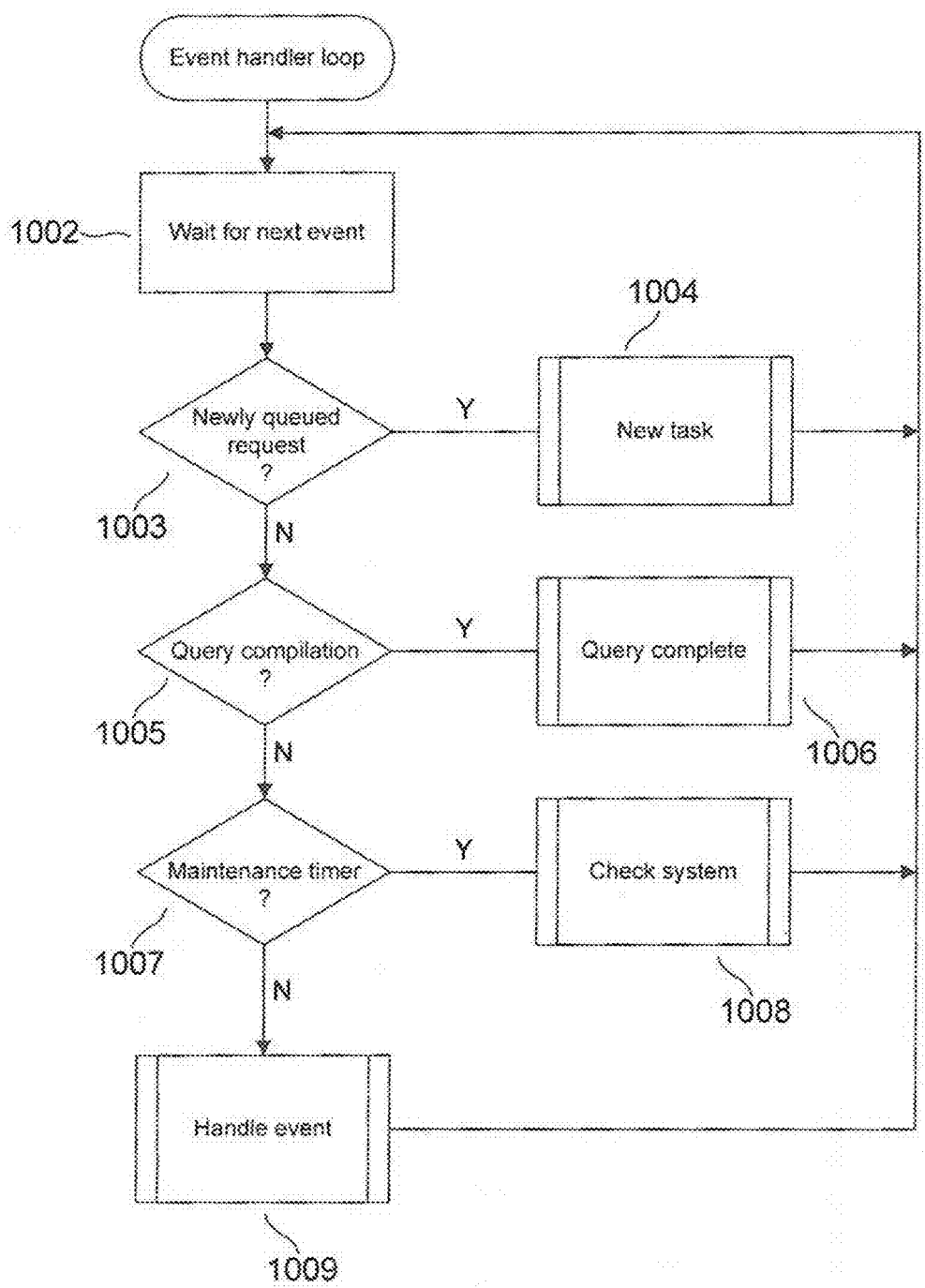
FIG. 10 is a control-flow diagram for a high-level event-handler loop of the query-execution engine within a distributed parallel database-management system implemented according to embodiments of the present invention.

FIG. 10 is a control-flow diagram for a high-level event-handler loop of the query-execution engine within a distributed parallel database-management system implemented according to embodiments of the present invention. The loop, comprising steps 1002-1009, executes continuously in order that all events that arise are properly handled. In step 1002, the query-processing engine waits for a next event. When a next event occurs, the query-processing engine determines, in step 1003, whether the event corresponds to reception of a new query-processing request from a host computer on the input queue (402 in FIG. 4). If so, then the routine "new task" is called in step 1004. Otherwise, if the event corresponds to a query-processing-task completion, as determined in step 1005, then the routine "query complete" is called in step 1006. If the event is a maintenance-timer event, as determined in step 1007, then the routine "check system" is called in step 1008, while other events are handled by a general event handler in step 1009. The control-flow diagrams use generalized event handlers, such as that called in step 1009 of FIG. 10, to avoid unnecessary detail not directly related to the present invention.

Figure 11:
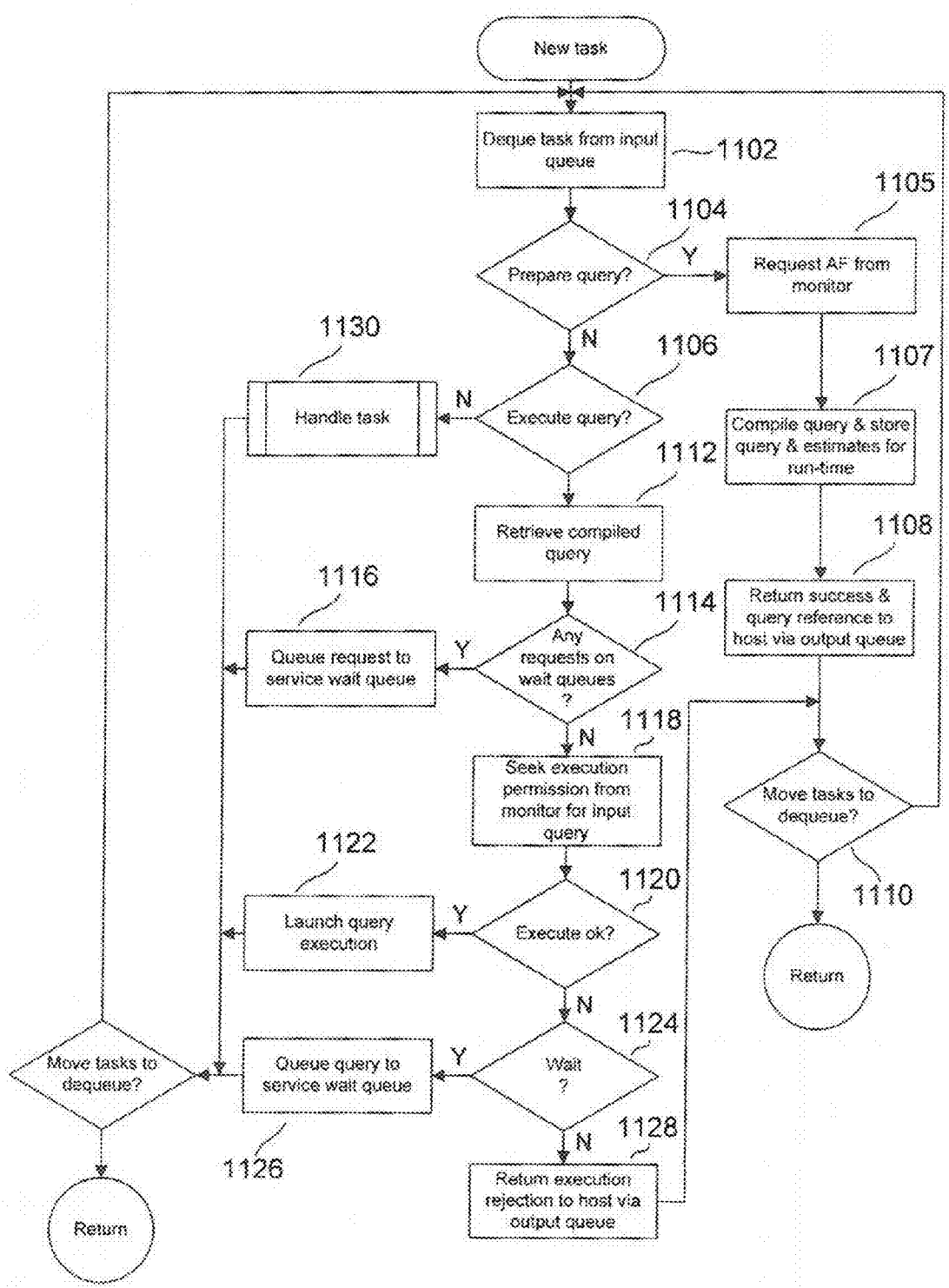
FIG. 11 shows a control-flow diagram for the routine "new task," called in step 1004 of FIG. 10, implemented according to embodiments of the present invention.

FIG. 11 shows a control-flow diagram for the routine "new task," called in step 1004 of FIG. 10, implemented according to embodiments of the present invention. In step 1102, an input request is dequeued from the input queue. If the request is a query-preparation request, as determined in step 1104, then, in step 1105, the routine "new task" requests an AF from the monitor, compiles the query and stores the compiled query and estimates of the portions of various resource capacities needed for execution of the query, in step 1107, before returning a success status and compiled-query reference to the requesting host computer, in step 1108. When more requests are available for dequeuing from the input queue, as determined in step 1110, then control flows back to step 1102. Otherwise, if the dequeued task is a query-processing request, as determined in step 1106, then the previously compiled query corresponding to the query-processing request is retrieved, in step 1112. If any query-processing requests are currently queued to wait queues associated with resources that will be consumed by the input query-processing request, as determined in step 1114, then the input query-processing request is queued to a wait queue for one of the resources, in step 1116. Otherwise, in step 1118, the routine "new task" calls an execution-permission routine of the monitor to determine whether or not the query-processing request can be executed. If execution is indicated by the monitor, as determined in step 1120, then the task is launched in step 1122, using the AF-based launching distribution method discussed with reference to FIG. 9. Otherwise, if the monitor has indicated that execution of the query-processing request be deferred as determined in step 1124, then the query-processing request is queued in step 1126, to a service wait queue associated with a resource, used by the task, for which there is current insufficient capacity. Otherwise, the monitor has indicated that the task be rejected, and therefore, in step 1128, a rejection notification is sent to the host computer via the output queue. All other tasks are handled by a generic task handler in step 1130.

Figure 12:
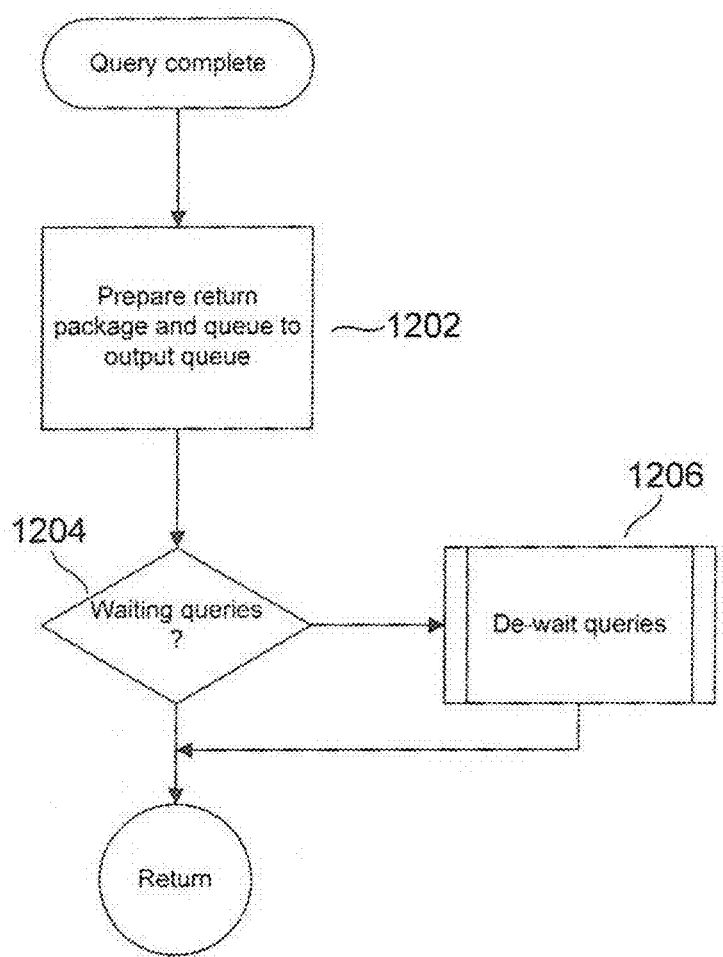
FIG. 12 shows a control-flow diagram for the routine "query complete," called in step 1006 of FIG. 10 and implemented according to embodiments of the present invention.

FIG. 12 shows a control-flow diagram for the routine "query complete," called in step 1006 of FIG. 10 and implemented according to embodiments of the present invention. In step 1202, a return status and data are prepared and queued to the output queue (403 in FIG. 4) for return to the host computer associated with the completed query. If there are any waiting query-processing requests queued to wait queues, as determined in step 1204, then the routine "de-wait queries" is called in step 1206.

Figure 13:
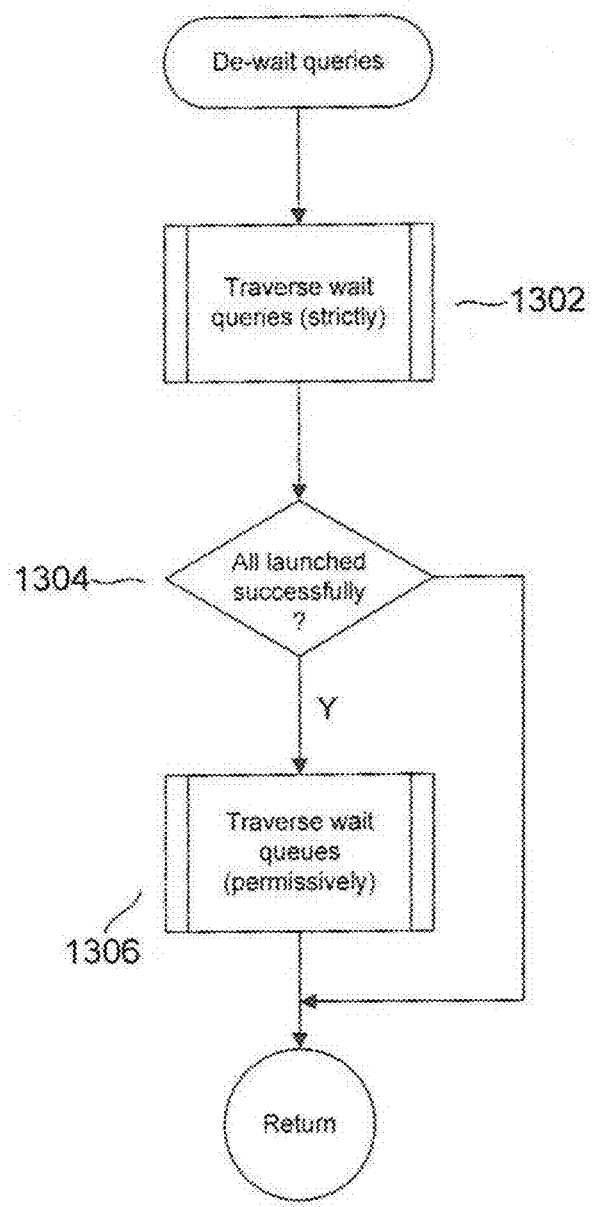
FIG. 13 is a control-flow diagram for the routine "de-wait queries," called in step 1206 of FIG. 12 and implemented according to embodiments of the present invention.

FIG. 13 is a control-flow diagram for the routine "de-wait queries," called in step 1206 of FIG. 12 and implemented according to embodiments of the present invention. In step 1302, the various wait queues are traversed, in a first pass, to dequeue and launch waiting query-processing requests. If all of the query-processing requests that can be dequeued and launched are successfully dequeued and launched in this first pass, as determined in step 1304, then a second call is made to the "traverse wait queues" routine to launch any remaining query-processing requests up to the available usable capacities of any of the resources used by the query-processing requests, in step 1306.

Figure 14:
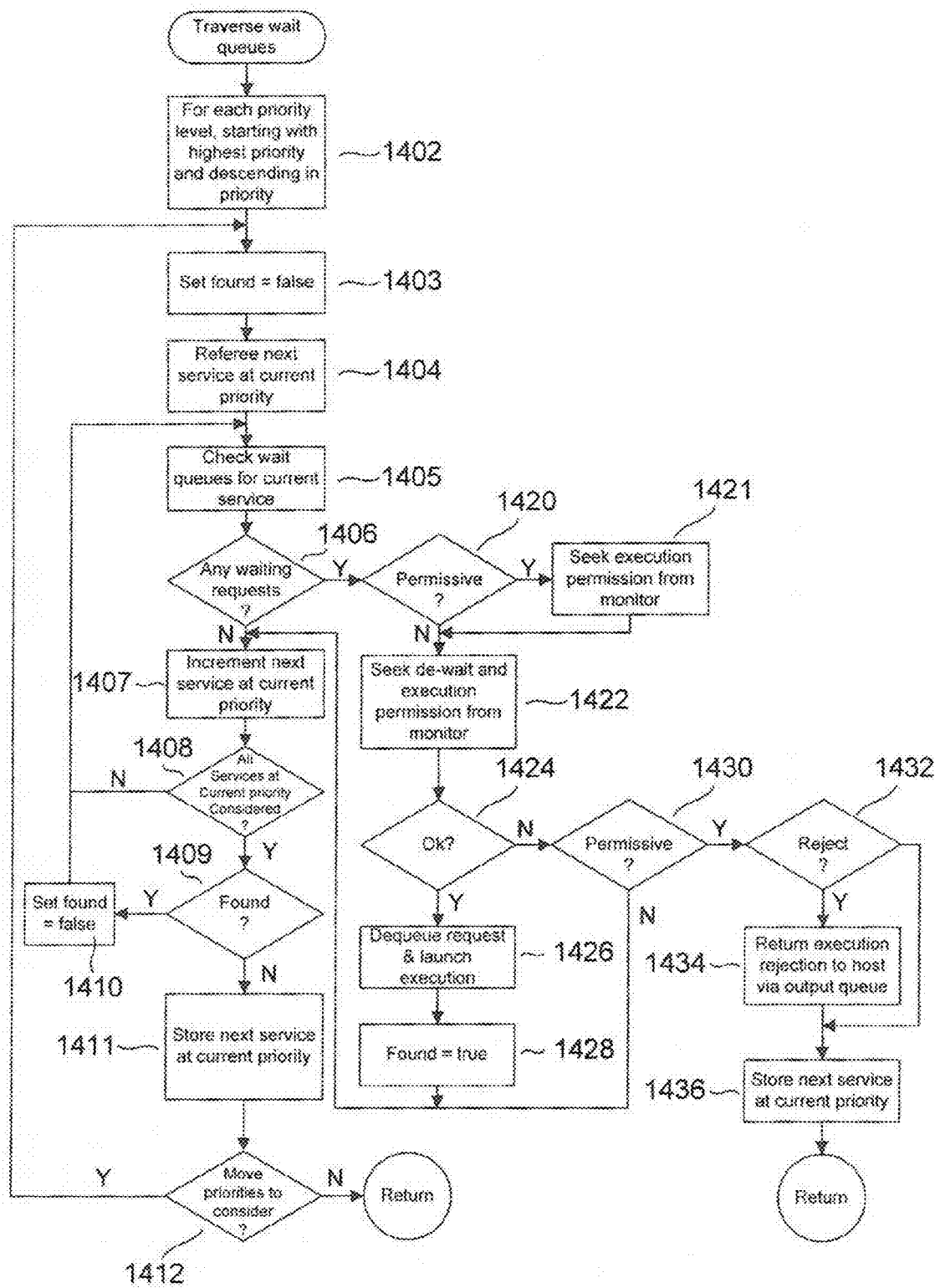
FIG. 14 is a control-flow diagram for the routine "traverse wait queues," called in steps 1302 and 1306 of FIG. 13 and implemented according to embodiments of the present invention.

FIG. 14 is a control-flow diagram for the routine "traverse wait queues," called in steps 1302 and 1306 of FIG. 13 and implemented according to embodiments of the present invention. In the outer for-loop of steps 1402-1412, all of the priority levels of all of the services are considered, starting with the highest priority level, in decreasing-priority-level order. For each new, currently considered priority level, the local variable "found" is set to FALSE, in step 1403. In step 1404, a stored indication of a next service to consider in the outer for-loop is retrieved. All of the services at the currently considered priority are considered in an inner loop comprising steps 1405-1408. In step 1405, the wait queues associated with the current service are checked for any waiting query-processing requests. When a waiting query-processing request is found, and when the routine "traverse wait queues" is called permissively (1306 in FIG. 13), then the routine "traverse wait queues" seeks permission for execution of the waiting query-processing request in step 1421 from the monitor. Otherwise, the routine "traverse wait queues" seeks permission to dequeue and execute the query-processing request, in step 1422. When the monitor indicates that the query-processing requests can be executed, as determined in step 1424, then the task is dequeued from the wait queue, in step 1426 and launched for execution, and the local variable "found" is set to TRUE in step 1428. Otherwise, in the case of a permissive call to the routine "traverse wait queues" 1306 in FIG. 13, consideration of service queues continues. Otherwise, in step 1432, when the monitor has indicated that the task should be rejected, then the task is rejected in step 1434 and the next-service-for-consideration indication is stored for subsequent retrieval in step 1436.

Implementation of the routine "traverse wait queues" in FIG. 14 assumes that each query-processing task uses a portion of the capacity of all the aggregated computational resources, so that, in the case of a permissive call to "traverse wait queues," when any query-processing request is rejected or queued to continue waiting, the traversal of the wait queues is discontinued, since no other waiting query-processing request is eligible. In more complex implementations, in which not all query-processing tasks use portions of the capacities of all aggregate resources, the traversal may continue, rather than be discontinued, because there may be tasks in wait queues that can be executed.

Figure 15:
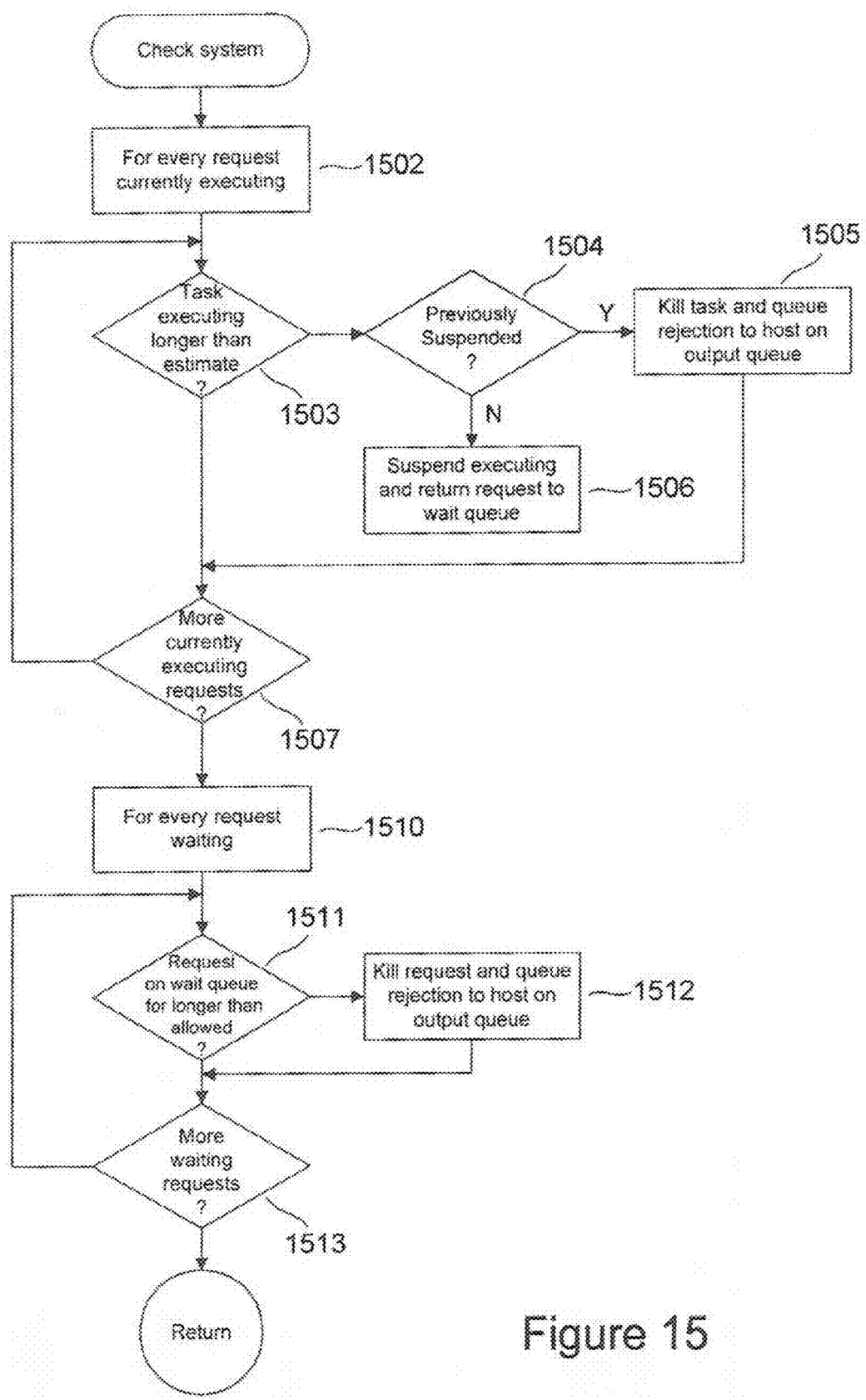
FIG. 15 provides a control-flow diagram for the routine "check system," called in step 1008 in FIG. 10 and implemented according to embodiments of the present invention.

FIG. 15 provides a control-flow diagram for the routine "check system," called in step 1008 in FIG. 10 and implemented according to embodiments of the present invention. In the for-loop of steps 1502-1507, all currently executing queries are examined, and any queries that have exceeded their estimated execution time, generally by some threshold margin, are either suspended, in step 1506, or killed, in step 1505, depending on whether or not the query was previously suspended for exceeding its execution time. In the for-loop of steps 1510-1513, all waiting tasks on wait queues are analyzed to see if they have waited longer than the maximum wait time specified for their associated service, and, if so, are killed in step 1512.

Figure 16:
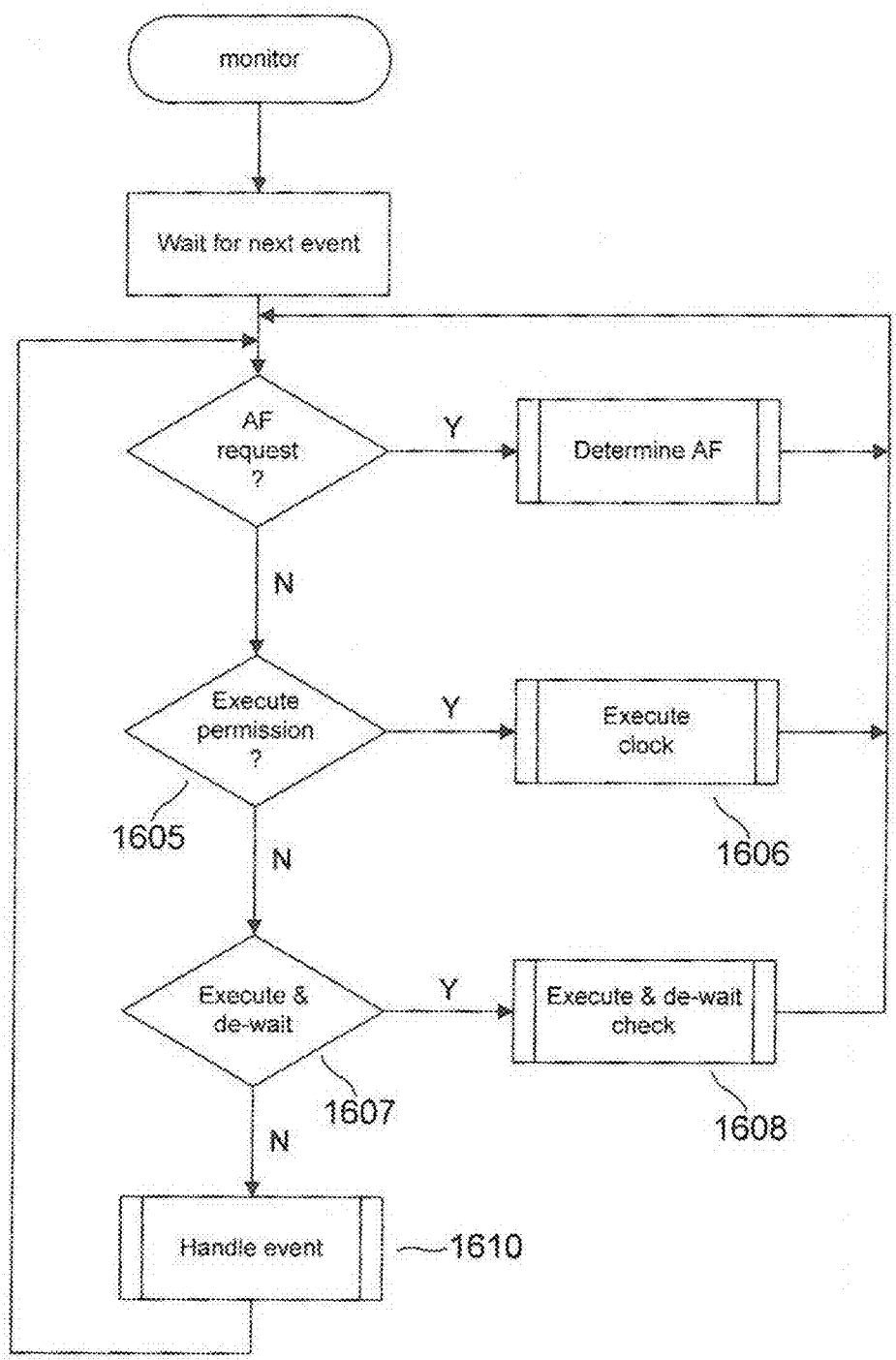
FIG. 16 is a control-flow diagram for the monitor, or workload management-services component, within a distributed parallel database-management system implemented according to embodiments of the present invention.

FIG. 16 is a control-flow diagram for the monitor, or workload management-services component, within a distributed parallel database-management system implemented according to embodiments of the present invention. FIG. 16 is a control-flow diagram of an event handler, similar to that shown in FIG. 10 for the query-processing engine. The event handler handles any events that arise. For example, when the monitor receives a request to seek permission for execution of a query-processing request, as determined in step 1605, the routine "execute check" is called, in step 1606. Similarly, if the monitor receives a request to seek permission for dequeuing and executing a query-processing request, as determined in step 1607, then the routine "execute and dewait check" is called in step 1608. Timer firings that elicit monitoring of resource usage within the computer system, and all other events, are handled by a generalized event handler 1610. As discussed above, AF requests are handled by the monitor by allocating a number of processors equal to the DOP of a query-processing request that is being prepared by the query-processing engine to map the distributed subtasks corresponding to the query-processing request onto processors with projected available bandwidth.

Figure 17:
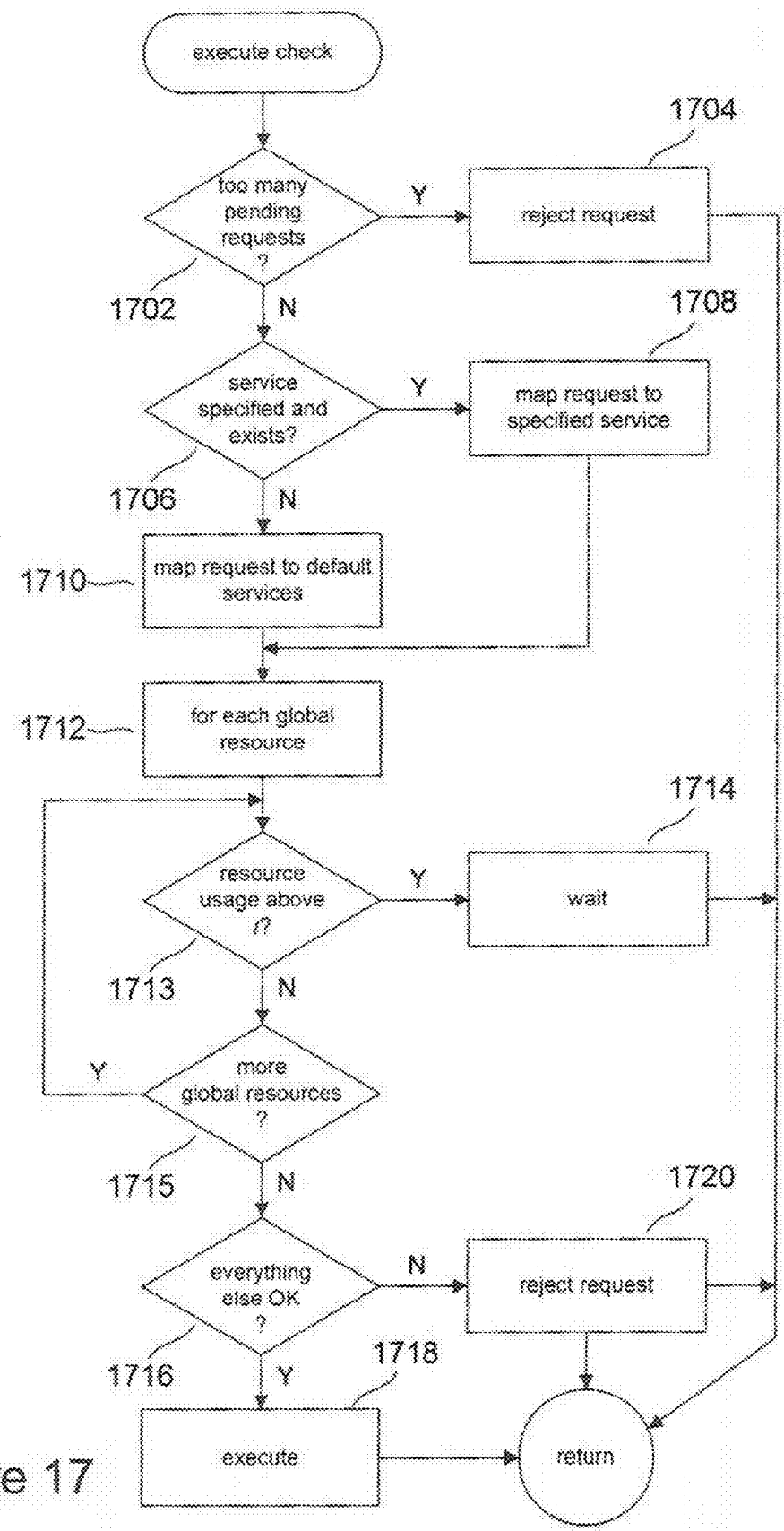
FIG. 17 is a control-flow diagram for the routine "execute check," called in step 1606 of FIG. 16 and implemented according to embodiments of the present invention.

FIG. 17 is a control-flow diagram for the routine "execute check," called in step 1606 of FIG. 16 and implemented according to embodiments of the present invention. The routine "execute check" is called for newly arrived query-processing request and for query-processing request that are candidates for dequeuing in the second pass of traversing wait queues (1306) in the above-described dewait-queries routine. When too many query-processing requests are already pending, as determined in step 1702, then the query-processing request is rejected, in step 1704. When the service with which the query-processing request is associated is specified in the call, as determined in step 1706, then the query-processing request is mapped to that service in step 1708. Otherwise the query-processing request is mapped, or associated with, a default service in step 1710. Then, for each aggregate computational resource, in the for-loop of steps 1712-1715, the routine "execute check" determines whether the resource is currently used above its maximum usable capacity. If so, then the routine "execute check" returns an indication that the query-processing request should be placed in a wait queue, in step 1714. Next, everything else associated with the query-processing request is checked, in step 1716, to determine that the task is ready for execution. Additional considerations may be, for example, whether or not the service, with which the query-processing request is associated, is currently active, whether any error conditions have made execution of the query-processing request currently impossible, or other such considerations. When everything else concerned with query-processing-request execution appears to be in good order, then the routine "execute check" returns an indication that the query-processing request should be executed, in step 1718. Otherwise, an indication that the query-processing request should be rejected is returned in step 1720.

Note that, in various different embodiments of the present invention, functionality shown, in the currently described implementation, as residing within the monitor, such as query-processing-request checking described above, may alternatively be carried out by a query-execution-engine routine, and functionality shown as residing within the query-execution engine may instead be carried out by monitor routines. In other words, the partitioning of functionality between the query-processing engine and monitor is, to some degree, arbitrary. However, in general, the functionality partitioning is carried out so that the overall system is as efficient as possible. Because the monitor maintains statistics on resource consumption, it is generally more efficient for the monitor to carry out aspects of query-processing-request-execution authorization related to availability of computational-resource capacity.

Figure 18:
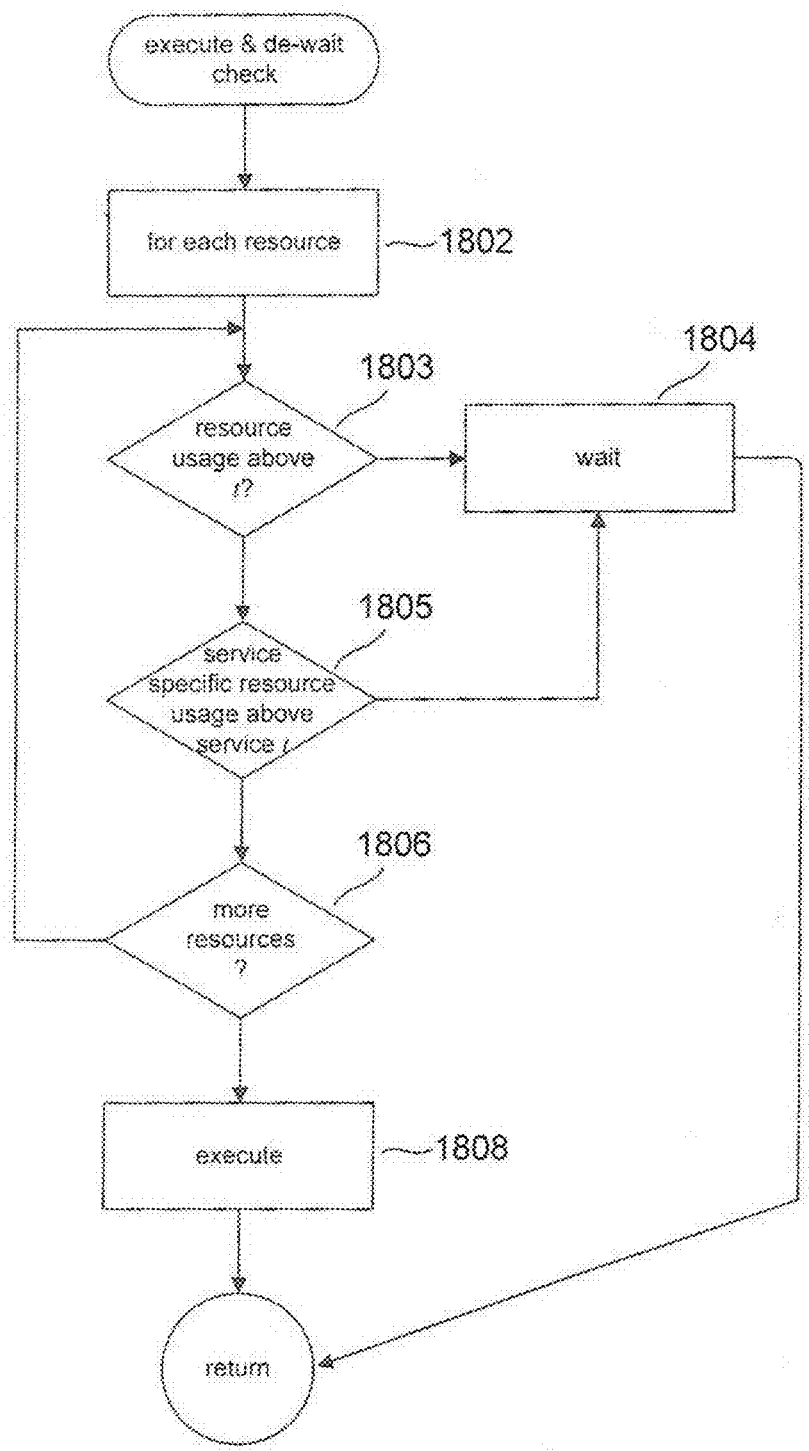
FIG. 18 is a control-flow diagram for the routine "execute and de-wait check," called in step 1606 of FIG. 16 and implemented according to embodiments of the present invention.

FIG. 18 is a control-flow diagram for the routine "execute and dewait check," called in step 1606 of FIG. 16 and implemented according to embodiments of the present invention. In the for-loop of steps 1802-1806, the routine "execute and dewait check" determines whether or not all of the computational resources have sufficient capacity to execute the query-processing request and whether or not the service with which the query-processing request is associated also has sufficient available allocated capacity for executing the query-processing request. If not, then an indication that the query-processing request should be queued to a wait queue for waiting is returned to the query-processing engine in step 1804. Otherwise, an indication that the query-processing request should be executed is returned to the query-processing engine in step 1808.

Although the present invention has been described in terms of particular embodiments, it is not intended that the invention be limited to these embodiments. Modifications will be apparent to those skilled in the art. For example, the workload management methods of the present invention may be implemented in any number of different programming languages for execution on any number of different types of computer systems within parallel, distributed database-management systems, and the implementations may vary by varying any of the common implementation parameters, such as control structures, data structures, variables, modular organization, and other such parameters. The workload management implementations may vary in complexity, depending on the number and types of computational resources considered when determining whether to launch query-processing requests, place query-processing requests on wait queues, or reject query-processing requests. In particular, in cases where a given query-processing request may not use all of the available computational resources, traversals of wait queues may continue to exhaustively consider each waiting query-processing request, even though previous query-processing requests have not been launched, since subsequent query-processing requests cannot use resources on which previously considered tasks are blocked. The order of dequeuing of waiting query-processing requests may be based on longest-elapsed wait times, on input order, or based on many other considerations.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A parallel database-management system comprising:
    two or more computer systems, each including multiple processors, shared memory, and one or more of internal mass-storage and attached mass-storage;
    a workload-management-services component that monitors usage of shared computational resources in the parallel database-management system and that provides a query-processing-task-management interface; and
    a query-execution engine that receives query-processing requests associated with one of a number of services from host computers and accesses the workload-management-services component to determine whether to immediately launch execution of query-processing tasks corresponding to the received query-processing requests or to place the query-processing requests on wait queues for subsequent execution based on the current usage of shared computational resources within the parallel database-management system.

2. The parallel database-management system of claim 1 wherein the shared computational resources include one or more of:
    aggregate processor bandwidth;
    individual processor bandwidths;
    aggregate electronic memory storage capacity;
    storage capacities of individual logical memory devices;
    storage capacities of individual physical memory devices;
    aggregate mass-storage capacity; and
    capacities of individual mass-storage devices.

3. The parallel database-management system of claim 1 wherein the workload-management-services component periodically calls operating-system routines to determine what portion of each shared computational-resource capacity is currently used and maintains maximum-usage thresholds for each shared computational resource.

4. The parallel database-management system of claim 3 wherein the workload-management-services component additionally monitors the portion of each shared computational-resource capacity that is currently used by query-processing tasks associated with each of the number of services and maintains per-service capacity allocations for each shared computational resource.

5. The parallel database-management system of claim 1 wherein each received query-processing request includes an indication of estimated computational-resource capacities needed to execute the query-processing request.

6. The parallel database-management system of claim 5 wherein each service is represented by a service data structure that contains indications of the times at which the service is active, one or more priorities, maximum wait times, and control flags.

7. The parallel database-management system of claim 6 wherein query-execution engine, upon receiving a query-processing request from a remote host computer:
    when any other query-processing tasks are queued to wait queues associated with a computational resource used to execute the received query-processing request,
        queues the query-processing request to a wait queue;
        accesses the workload-management-services component to determine whether to immediately launch execution of a query-processing task to execute the query-processing request;
    when the workload-management-services component indicates execution of the query-processing request,
        queues the query-processing request to a wait queue;
    when the workload-management-services component indicates that execution should be deferred,
        queues the query-processing request to a wait queue; and
    when the workload-management-services component indicates that the received query-processing request should be rejected,
        rejects the query-processing request by returning a rejection indication to the remote host computer.

8. The parallel database-management system of claim 7 wherein the workload-management-services component indicates that execution should be deferred when:
    a computational resource used to execute the query-processing request has insufficient available additional capacity to execute the query-processing task that would be launched to execute the query-processing request.

9. The parallel database-management system of claim 7 wherein the workload-management-services component indicates that the received query-processing request should be rejected when:
    the service with which the query-processing request is associated is not active; or
    too many query-processing requests are pending and executing within the parallel database-management system.

10. The parallel database-management system of claim 7 wherein the query-execution engine additionally traverses wait queues, for each query-processing request queued to a wait queue
    accessing the workload-management-services component to determine whether or not to dequeue the query-processing request from the wait queue; and when the workload-management-services component indicates execution of the query-processing request,
queuing the query-processing request to an execution queue and launching a query-processing task on one or more processors to execute the query-processing request.

11. The parallel database-management system of claim 10 wherein the workload-management-services component indicates execution of the query-processing request when each computational resource used to execute the query-processing request has available capacity to execute the query-processing request and available per-service capacity to execute the query-processing request with respect to the service with which the query-processing request is associated.

12. The parallel database-management system of claim 10 wherein the query-execution engine launches the query-processing task by launching sub-tasks on each of a number of processors indicated by a degree-of-parallelism number associated with the query-processing request.

13. The parallel database-management system of claim 10 further including launching a first subtask on a processor indicated by an affinity value associated with the query-processing request and launching the remaining subtasks on processors with processor-numbers obtained by successive modulo addition of an interval number computed by adding the ratio of the number of processors in the parallel database-management system to the degree-of-parallelism number to a processor number on which a preceding subtask was launched.

14. A method for distributing workload within a parallel database-management system, the method comprising:
monitoring usage of shared computational resources in the parallel database-management system; and
for each received query-processing request associated with one of a number of services from remote host computers,
when the service with which the query-processing request is associated is currently not available,
rejecting the query-processing request;
when each shared computational resource used to execute the query-processing request has sufficient available capacity, and when no other query-processing request is waiting on the shared computational resource in a wait queue,
immediately launching execution of a query-processing task corresponding to the received query-processing request, and
otherwise queuing the query-processing request on a wait queue associated with a shared computational resource without sufficient available capacity to execute the request.

15. The method of claim 14 further including:
continuously monitoring wait queues to find queued query-processing requests for each of which the shared computational resources used to execute the query have sufficient available capacity and sufficient available per-service capacity to execute the query-processing request; and
launching execution of query-processing tasks corresponding to the found query-processing requests.

* * * * *